United States Patent
DiGiovanni et al.

(10) Patent No.: US 10,337,255 B2
(45) Date of Patent: Jul. 2, 2019

(54) CUTTING ELEMENTS FOR EARTH-BORING TOOLS, EARTH-BORING TOOLS INCLUDING SUCH CUTTING ELEMENTS, AND RELATED METHODS

(71) Applicants: Baker Hughes Incorporated, Houston, TX (US); Element Six Limited, County Claire (IE)

(72) Inventors: Anthony A. DiGiovanni, Houston, TX (US); Yavuz Kadioglu, Spring, TX (US); Danny E. Scott, Montgomery, TX (US); Matthew J. Meiners, Conroe, TX (US); Rudolf Carl Pessier, Houston, TX (US); Nicholas J. Lyons, Houston, TX (US); Clement D. van der Riet, County Clare (ZA); Donald Royceton Herschell, Gauteng (ZA); Cornelis Roelof Jonker, Gauteng (ZA); Roger William Nilen, London (GB); Gerard Peter Dolan, Gauteng (ZA)

(73) Assignees: Baker Hughes Incorporated, Houston, TX (US); Element Six Limited, County Claire (IE)

( * ) Notice: Subject to any disclaimer, the term of this patent is extended or adjusted under 35 U.S.C. 154(b) by 619 days.

(21) Appl. No.: 14/980,653

(22) Filed: Dec. 28, 2015

(65) Prior Publication Data

US 2016/0130882 A1    May 12, 2016

Related U.S. Application Data

(62) Division of application No. 13/477,905, filed on May 22, 2012, now Pat. No. 9,243,452.

(51) Int. Cl.
   *E21B 10/567*    (2006.01)
   *E21B 7/00*      (2006.01)
   (Continued)

(52) U.S. Cl.
   CPC ......... *E21B 10/5673* (2013.01); *B24D 18/00* (2013.01); *E21B 7/00* (2013.01);
   (Continued)

(58) Field of Classification Search
   CPC ........................... E21B 10/5673; E21B 10/56
   See application file for complete search history.

(56) References Cited

U.S. PATENT DOCUMENTS

| 4,224,380 A | 9/1980 | Bovenkerk et al. |
| 4,538,690 A | 9/1985 | Short |

(Continued)

FOREIGN PATENT DOCUMENTS

| CN | 2131968 Y | 5/1993 |
| CN | 2278759 Y | 4/1998 |

(Continued)

OTHER PUBLICATIONS

Guilin Color Engineered Diamond Technology (EDT) Co. Ltd., Brochure, Offshore Technology Conference Apr. 30-May 3, 2012.

(Continued)

*Primary Examiner* — Giovanna C Wright
(74) *Attorney, Agent, or Firm* — TraskBritt

(57) ABSTRACT

Cutting elements for earth-boring tools include one or more recesses and/or one or more protrusions in a cutting face of a volume of superabrasive material. The superabrasive material may be disposed on a substrate. The cutting face may be non-planar. The recesses and/or protrusions may include one or more linear segments. The recesses and/or protrusions may comprise discrete features that are laterally isolated from one another. The recesses and/or protrusions may have a helical configuration. The volume of superabrasive material may comprise a plurality of thin layers, at least two of which may differ in at least one characteristic. Methods of forming cutting elements include the formation (Continued)

of such recesses and/or protrusions in and/or on a cutting face of a volume of superabrasive material. Earth-boring tools include such cutting elements, and methods of forming earth-boring tools include attaching such a cutting element to a tool body.

14 Claims, 10 Drawing Sheets

(51) Int. Cl.
  *E21B 10/573* (2006.01)
  *E21B 10/60* (2006.01)
  *B24D 18/00* (2006.01)
  B22F 5/00 (2006.01)
  B23P 15/28 (2006.01)

(52) U.S. Cl.
  CPC ............ *E21B 10/573* (2013.01); *E21B 10/60* (2013.01); *B22F 2005/001* (2013.01); *B23P 15/28* (2013.01)

(56) References Cited

U.S. PATENT DOCUMENTS

| | | |
|---|---|---|
| 4,539,018 A | 9/1985 | Whanger |
| 4,558,753 A | 12/1985 | Barr |
| 4,593,777 A | 6/1986 | Barr |
| 4,629,373 A | 12/1986 | Hall |
| 4,858,707 A | 8/1989 | Jones et al. |
| 4,872,520 A | 10/1989 | Nelson |
| 4,984,642 A | 1/1991 | Renard et al. |
| 4,997,049 A | 3/1991 | Tank et al. |
| 5,007,207 A | 4/1991 | Phaal et al. |
| 5,054,246 A | 10/1991 | Phaal et al. |
| 5,078,219 A | 1/1992 | Morrell et al. |
| 5,127,923 A | 7/1992 | Bunting et al. |
| 5,172,778 A | 12/1992 | Tibbitts |
| 5,333,699 A | 8/1994 | Thigpen |
| 5,351,772 A | 10/1994 | Smith |
| 5,355,969 A | 10/1994 | Hardy et al. |
| 5,377,773 A | 1/1995 | Tibbitts |
| 5,437,343 A | 8/1995 | Cooley et al. |
| 5,447,208 A | 9/1995 | Lund et al. |
| 5,449,048 A | 9/1995 | Thigpen et al. |
| 5,533,582 A | 7/1996 | Tibbitts |
| 5,549,171 A | 8/1996 | Mensa et al. |
| 5,569,000 A | 10/1996 | Littecke et al. |
| 5,607,024 A | 3/1997 | Keith |
| 5,653,300 A | 8/1997 | Lund et al. |
| 5,957,228 A | 9/1999 | Yorston et al. |
| 5,984,005 A | 11/1999 | Hart et al. |
| 6,006,846 A | 12/1999 | Tibbitts et al. |
| 6,026,919 A | 2/2000 | Thigpen et al. |
| 6,045,440 A | 4/2000 | Johnson et al. |
| 6,050,354 A | 4/2000 | Pessier et al. |
| 6,059,054 A | 5/2000 | Portwood et al. |
| 6,065,554 A | 5/2000 | Taylor et al. |
| 6,068,071 A | 5/2000 | Jurewicz et al. |
| 6,145,608 A | 11/2000 | Lund et al. |
| 6,164,394 A | 12/2000 | Mensa-Wilmot et al. |
| 6,196,340 B1 | 3/2001 | Jensen et al. |
| 6,196,910 B1 * | 3/2001 | Johnson ................ B23B 27/143 451/539 |
| 6,202,770 B1 | 3/2001 | Jurewicz et al. |
| 6,202,771 B1 | 3/2001 | Scott et al. |
| 6,216,805 B1 | 4/2001 | Lays et al. |
| 6,220,376 B1 | 4/2001 | Lundell |
| 6,227,319 B1 | 5/2001 | Radford |
| 6,328,117 B1 | 12/2001 | Berzas et al. |
| 6,488,106 B1 | 12/2002 | Dourfaye |
| 6,524,363 B2 | 2/2003 | Gates, Jr. et al. |
| 6,527,065 B1 | 3/2003 | Tibbitts et al. |
| 6,550,556 B2 | 4/2003 | Middlemiss et al. |
| 6,935,444 B2 | 8/2005 | Lund et al. |
| 6,962,218 B2 | 11/2005 | Eyre |
| 7,000,715 B2 | 2/2006 | Sinor et al. |
| 7,188,692 B2 | 3/2007 | Lund et al. |
| 7,363,992 B2 | 4/2008 | Stowe et al. |
| 7,373,998 B2 | 5/2008 | Cariveau et al. |
| D570,384 S | 6/2008 | Morozov |
| 7,493,972 B1 | 2/2009 | Schmidt et al. |
| 7,533,740 B2 | 5/2009 | Zhang et al. |
| 7,740,090 B2 | 6/2010 | Shen et al. |
| 7,757,790 B1 | 7/2010 | Schmidt et al. |
| 7,814,998 B2 | 10/2010 | Patel et al. |
| 8,016,054 B2 | 9/2011 | Lancaster et al. |
| 8,061,456 B2 | 11/2011 | Patel et al. |
| 8,191,656 B2 | 6/2012 | Dourfaye et al. |
| 8,210,288 B2 | 7/2012 | Chen et al. |
| 8,240,405 B2 | 8/2012 | Lancaster et al. |
| 8,469,121 B2 | 6/2013 | Lancaster et al. |
| 8,684,112 B2 | 4/2014 | DiGiovanni et al. |
| 8,739,904 B2 | 6/2014 | Patel |
| D712,941 S | 9/2014 | Mo |
| 8,833,492 B2 | 9/2014 | Durairajan et al. |
| 2002/0071729 A1 | 6/2002 | Middlemiss et al. |
| 2004/0009376 A1 | 1/2004 | Wan et al. |
| 2005/0247492 A1 | 11/2005 | Shen et al. |
| 2005/0269139 A1 | 12/2005 | Shen et al. |
| 2006/0201712 A1 * | 9/2006 | Zhang ................... E21B 10/567 175/57 |
| 2007/0235230 A1 | 10/2007 | Cuillier et al. |
| 2008/0006448 A1 | 1/2008 | Zhang et al. |
| 2008/0035380 A1 | 2/2008 | Hall et al. |
| 2008/0164071 A1 | 7/2008 | Patel et al. |
| 2008/0264696 A1 * | 10/2008 | Dourfaye .............. E21B 10/573 175/428 |
| 2008/0308321 A1 | 12/2008 | Aliko et al. |
| 2009/0057031 A1 | 3/2009 | Patel et al. |
| 2009/0090562 A1 * | 4/2009 | Shen ................... E21B 10/5735 175/434 |
| 2009/0114628 A1 | 5/2009 | DiGiovanni |
| 2009/0321146 A1 | 12/2009 | Dick et al. |
| 2010/0084198 A1 * | 4/2010 | Durairajan .............. E21B 10/55 175/430 |
| 2010/0108403 A1 | 5/2010 | Keshavan |
| 2010/0243337 A1 | 9/2010 | Scott |
| 2010/0276200 A1 | 11/2010 | Schwefe et al. |
| 2010/0307829 A1 * | 12/2010 | Patel ................... E21B 10/5673 175/57 |
| 2010/0326742 A1 | 12/2010 | Vempati et al. |
| 2011/0000714 A1 | 1/2011 | Durairajan et al. |
| 2011/0031030 A1 | 2/2011 | Shen et al. |
| 2011/0031031 A1 | 2/2011 | Vempati et al. |
| 2011/0031036 A1 | 2/2011 | Patel |
| 2011/0088950 A1 | 4/2011 | Scott et al. |
| 2011/0171414 A1 | 7/2011 | Sreshta et al. |
| 2011/0259642 A1 | 10/2011 | DiGiovanni et al. |
| 2011/0303466 A1 | 12/2011 | DiGiovanni |
| 2011/0315455 A1 | 12/2011 | Stowe et al. |
| 2012/0205162 A1 | 8/2012 | Patel et al. |
| 2013/0068534 A1 | 3/2013 | DiGiovanni et al. |
| 2013/0068537 A1 | 3/2013 | DiGiovanni |
| 2013/0068538 A1 | 3/2013 | DiGiovanni et al. |
| 2013/0292188 A1 | 11/2013 | Bilen et al. |
| 2014/0238753 A1 | 8/2014 | Nelms et al. |
| 2014/0246253 A1 | 9/2014 | Patel et al. |

FOREIGN PATENT DOCUMENTS

| | | |
|---|---|---|
| CN | 2579580 Y | 10/2003 |
| CN | 1714224 A | 12/2005 |
| CN | 201024900 Y | 2/2008 |
| CN | 201202408 Y | 3/2009 |
| EP | 0356097 A2 | 2/1990 |
| EP | 546725 A1 | 6/1993 |
| EP | 835981 A2 | 4/1998 |
| EP | 0079699 A1 | 3/1999 |
| EP | 979699 A1 | 8/1999 |
| WO | 9415058 A1 | 7/1994 |
| WO | 9427769 A1 | 12/1994 |

(56) References Cited

FOREIGN PATENT DOCUMENTS

| WO | 0048789 A1 | 8/2000 |
| WO | 0160554 A1 | 8/2001 |
| WO | 2008006010 A3 | 1/2008 |
| WO | 2010141579 A2 | 12/2010 |

OTHER PUBLICATIONS

Guilin Star Diamond Superhard Material Co. Ltd., Brochure, Offshore Technology Conference Apr. 30-May 3, 2012.
International Search Report for International Application No. PCT/US2013/042221 dated Aug. 22, 2013, 3 pages.
International Written Opinion for International Application No. PCT/US2013/042221 dated Aug. 22, 2013, 8 pages.
International Preliminary Report on Patentability for International Application No. PCT/US2013/042221 dated Nov. 25, 2014, 9 pages.
Patel et al., U.S. Appl. No. 14/480,293 entitled, Multi-Chamfer Cutting Elements Having a Shaped Cutting Face, Earth-Boring Tools Including Such Cutting Elements, and Related Methods, filed Sep. 8, 2014.
Pilkey in Peterson's Stress Concentration Factors (2d ed., Wiley Interscience 1997), in Section 2.6.6, on p. 71 (1997).
European Search Report for European Application No. 13794471.6 dated Jul. 27, 2016, 11 pages.
CN Second Office Action for CN Application No. 201380038363.8 dated Sep. 9, 2016; 8 pages.
CN First Search for CN Application No. 201380038363.8 dated Nov. 12, 2015; 3 pages.
CN First Office Action for CN Application No. 201380038363.8 dated Nov. 24, 2015; 37 pages.

\* cited by examiner

CUTTING ELEMENTS FOR EARTH-BORING TOOLS, EARTH-BORING TOOLS INCLUDING SUCH CUTTING ELEMENTS, AND RELATED METHODS

CROSS-REFERENCE TO RELATED APPLICATIONS

This application is a divisional of U.S. patent application Ser. No. 13/477,905, filed May 22, 2012, now U.S. Pat. No. 9,243,452, issued Jan. 26, 2016, the entire disclosure of which is incorporated herein by this reference. The subject matter of this application is related to the subject matter of U.S. patent application Ser. No. 13/092,396, filed Apr. 22, 2011, in the name of DiGiovanni et al., now U.S. Pat. No. 8,684,112, issued Apr. 1, 2014, and to the subject matter of U.S. Provisional Patent Application Ser. No. 61/535,766, filed Sep. 16, 2011, in the name of DiGiovanni et al., the entire disclosure of each of which is incorporated herein by this reference. The subject matter of this application is further related to the subject matter of U.S. patent application Ser. No. 13/609,575, filed Sep. 11, 2012, now U.S. Pat. No. 9,103,174 issued Aug. 11, 2015 in the name of DiGiovanni, and to the subject matter of U.S. Provisional Patent Application Ser. No. 61/535,772, filed Sep. 16, 2011 in the name of DiGiovanni.

TECHNICAL FIELD

Embodiments of the present invention relate to earth-boring tools, cutting elements for such earth-boring tools, and related methods.

BACKGROUND

Wellbores are formed in subterranean formations for various purposes including, for example, extraction of oil and gas from the subterranean formation and extraction of geothermal heat from the subterranean formation. Wellbores may be formed in a subterranean formation using a drill bit such as, for example, an earth-boring rotary drill bit. Different types of earth-boring rotary drill bits are known in the art including, for example, fixed-cutter bits (which are often referred to in the art as "drag" bits), rolling-cutter bits (which are often referred to in the art as "rock" bits), diamond-impregnated bits, and hybrid bits (which may include, for example, both fixed cutters and rolling cutters). The drill bit is rotated and advanced into the subterranean formation. As the drill bit rotates, the cutters or abrasive structures thereof cut, crush, shear, and/or abrade away the formation material to form the wellbore. A diameter of the wellbore drilled by the drill bit may be defined by the cutting structures disposed at the largest outer diameter of the drill bit.

The drill bit is coupled, either directly or indirectly, to an end of what is referred to in the art as a "drill string," which comprises a series of elongated tubular segments connected end-to-end that extends into the wellbore from the surface of the formation. Often various tools and components, including the drill bit, may be coupled together at the distal end of the drill string at the bottom of the wellbore being drilled. This assembly of tools and components is referred to in the art as a "bottom-hole assembly" (BHA).

The drill bit may be rotated within the wellbore by rotating the drill string from the surface of the formation, or the drill bit may be rotated by coupling the drill bit to a downhole motor, which is also coupled to the drill string and disposed proximate the bottom of the wellbore. The downhole motor may comprise, for example, a hydraulic Moineau-type motor having a shaft, to which the drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore.

BRIEF SUMMARY

In some embodiments, the present disclosure includes a shaped cutting element for an earth-boring tool. The cutting element includes a substrate and a volume of superabrasive material disposed on the substrate. The volume of superabrasive material has a non-planar front cutting face and a lateral side surface. The cutting element further includes at least one of a recess extending into the volume of superabrasive material from the front cutting face, and a protrusion extending outward from the front cutting face of the volume of superabrasive material.

In additional embodiments, the present disclosure includes a cutting element for an earth-boring tool that includes a substrate and a volume of superabrasive material disposed on the substrate. The volume of superabrasive material has a front cutting face and a lateral side surface. The cutting element further includes at least one of a recess extending into the volume of superabrasive material from the front cutting face, and a protrusion extending outward from the front cutting face of the volume of superabrasive material. The at least one of a recess and a protrusion includes at least one linear segment extending linearly across the front cutting face in a direction oriented at least substantially transverse to a central axis of the cutting element.

In additional embodiments, the present disclosure includes a cutting element for an earth-boring tool. The cutting element includes a substrate and a volume of superabrasive material disposed on the substrate. The volume of superabrasive material has a front cutting face and a lateral side surface. The cutting element further includes at least one of a plurality of discrete, laterally isolated recesses extending into the volume of superabrasive material from the front cutting face, and a plurality of discrete, laterally isolated protrusions extending outward from the front cutting face of the volume of superabrasive material.

In additional embodiments, the present disclosure includes a cutting element for an earth-boring tool. The cutting element includes a substrate and a volume of superabrasive material disposed on the substrate. The volume of superabrasive material has a front cutting face and a lateral side surface. The cutting element further includes at least one of an elongated recess extending into the front cutting face and extending along a helical path from a location proximate a central axis of the cutting element to a lateral, peripheral edge of the cutting element, and an elongated protrusion extending outward from the front cutting face and extending along a helical path from a location proximate a central axis of the cutting element to a lateral, peripheral edge of the cutting element.

In additional embodiments, the present disclosure includes a cutting element for an earth-boring tool. The cutting element includes a substrate and a volume of superabrasive material disposed on the substrate. The volume of superabrasive material has a front cutting face and a lateral side surface. The cutting element further includes at least one of a recess extending into the volume of superabrasive material from the front cutting face and a protrusion extending outward from the front cutting face of the volume of superabrasive material. Additionally, a recess extends into the volume of superabrasive material from the lateral side surface of the volume of superabrasive material.

Additional embodiments of the present disclosure include earth-boring tools that include one or more of any of the embodiments of cutting elements as described herein attached to bodies of the earth-boring tools. Such an earth-boring tool may include, for example, a rotary drill bit, such as a fixed-cutter rotary drill bit or a roller cone rotary drill bit.

Additional embodiments of the present disclosure include methods of forming cutting elements as described herein.

In some embodiments, the present disclosure includes a method of forming a shaped cutting element for an earth-boring tool. A volume of superabrasive material is disposed on a substrate. A non-planar front cutting face and a lateral side surface is formed on the volume of superabrasive material. The method further includes forming at least one of a recess extending into the volume of superabrasive material from the front cutting face, and a protrusion extending outward from the front cutting face of the volume of superabrasive material.

In yet further embodiments, the present disclosure includes a method of forming a cutting element for an earth-boring tool in which a volume of superabrasive material is disposed on a substrate. The volume of superabrasive material is formed to have a front cutting face and a lateral side surface. Additionally, the method includes forming at least one of a recess extending into the volume of superabrasive material from the front cutting face, and a protrusion extending outward from the front cutting face of the volume of superabrasive material. The at least one of a recess and a protrusion is formed to include at least one linear segment extending linearly across the front cutting face in a direction oriented at least substantially transverse to a central axis of the cutting element.

In additional embodiments, the present disclosure includes a method of forming a cutting element for an earth-boring tool. A volume of superabrasive material is disposed on a substrate, and the volume of superabrasive material is formed to have a front cutting face and a lateral side surface. The method further includes forming at least one of a plurality of discrete, laterally isolated recesses extending into the volume of superabrasive material from the front cutting face and a plurality of discrete, laterally isolated protrusions extending outward from the front cutting face of the volume of superabrasive material.

In additional embodiments, the present disclosure includes a method of forming a cutting element for an earth-boring tool. A volume of superabrasive material is disposed on a substrate, and the volume of superabrasive material is formed to have a front cutting face and a lateral side surface. The method further includes forming at least one of an elongated recess extending into the front cutting face and extending along a helical path from a location proximate a central axis of the cutting element to a lateral, peripheral edge of the cutting element, and an elongated protrusion extending outward from the front cutting face and extending along a helical path from a location proximate a central axis of the cutting element to a lateral, peripheral edge of the cutting element.

In additional embodiments, the present disclosure includes a method of forming a cutting element for an earth-boring tool. A volume of superabrasive material is disposed on a substrate, and the volume of superabrasive material is formed to have a front cutting face and a lateral side surface. The method further includes forming at least one of a recess extending into the volume of superabrasive material from the front cutting face and a protrusion extending outward from the front cutting face of the volume of superabrasive material. The method additionally includes forming a recess extending into the volume of superabrasive material from the lateral side surface of the volume of superabrasive material.

Yet further embodiments of the present disclosure include forming a cutting element using a method as described herein, and attaching the cutting element to a body of an earth-boring tool.

BRIEF DESCRIPTION OF THE DRAWINGS

While the specification concludes with claims particularly pointing out and distinctly claiming what are regarded as embodiments of the present invention, various features and advantages of this invention may be more readily ascertained from the following description of example embodiments of the invention provided with reference to the accompanying drawings.

DETAILED DESCRIPTION

The illustrations presented herein are not actual views of any particular earth-boring tool, drill bit, or component of such a tool or bit, but are merely idealized representations which are employed to describe embodiments of the present invention.

As used herein, the term earth-boring tool means and includes any tool used to remove formation material and form a bore (e.g., a wellbore) through the formation by way of the removal of the formation material. Earth-boring tools include, for example, rotary drill bits (e.g., fixed-cutter or "drag" bits and roller cone or "rock" bits), hybrid bits including both fixed cutters and roller elements, coring bits, percussion bits, bi-center bits, reamers (including expandable reamers and fixed-wing reamers), and other so-called "hole-opening" tools.

As used herein, the term "cutting element" means and includes any element of an earth-boring tool that is used to cut or otherwise disintegrate formation material when the earth-boring tool is used to form or enlarge a bore in the formation.

Figure 1:
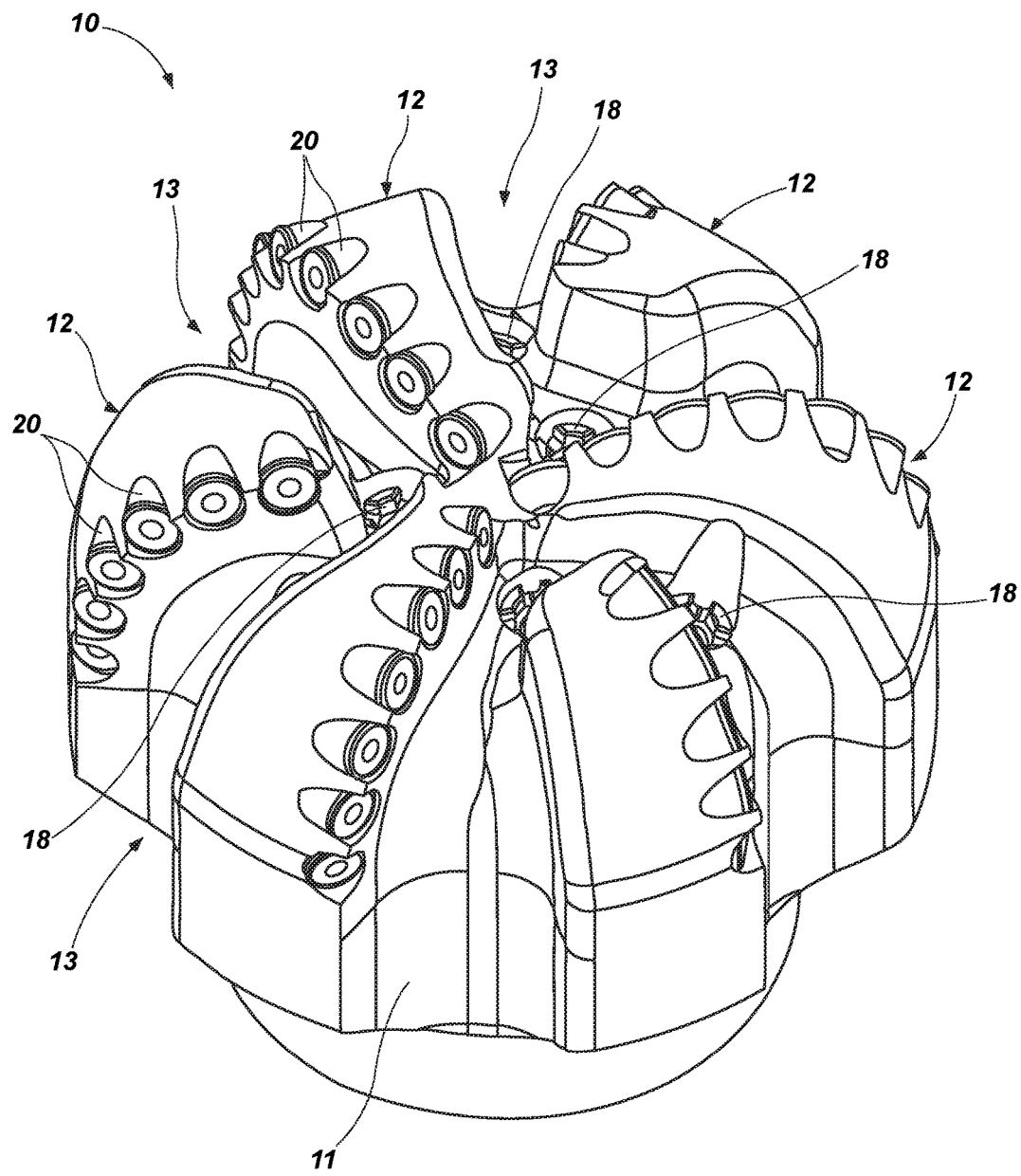
FIG. 1 is a perspective view of an earth-boring tool comprising a fixed-cutter rotary drill bit, which includes cutting elements as described herein attached to a body of the drill bit.

FIG. 1 illustrates an embodiment of an earth-boring tool of the present invention. The earth-boring tool of FIG. 1 is a fixed-cutter rotary drill bit 10 having a bit body 11 that includes a plurality of blades 12 that project outwardly from the bit body 11 and are separated from one another by fluid courses 13. The portions of the fluid courses 13 that extend along the radial sides (the "gage" areas of the drill bit 10) are often referred to in the art as "junk slots." The bit body 11 further includes a generally cylindrical internal fluid plenum, and fluid passageways that extend through the bit body 11 to the exterior surface of the bit body 11. Nozzles 18 may be secured within the fluid passageways proximate the exterior surface of the bit body 11 for controlling the hydraulics of the drill bit 10 during drilling. A plurality of cutting elements 20, various embodiments of which are described in further detail herein below, is mounted to each of the blades 12.

During a drilling operation, the drill bit 10 may be coupled to a drill string (not shown). As the drill bit 10 is rotated within the wellbore, drilling fluid may be pumped down the drill string, through the internal fluid plenum and fluid passageways within the bit body 11 of the drill bit 10, and out from the drill bit 10 through the nozzles 18. Formation cuttings generated by the cutting elements 20 of the drill bit 10 may be carried with the drilling fluid through the fluid courses 13, around the drill bit 10, and back up the wellbore through the annular space within the wellbore outside the drill string.

At least one of the cutting elements 20 may have any of a number of different configurations described herein in accordance with the present disclosure. In particular, at least one of the cutting elements 20 has a three-dimensional cutting face including at least one feature, such as a recess or a protrusion that may affect the aggressiveness of the cutting element, the durability of the cutting element, and the degree to which formation cuttings stick to the cutting face of the cutting element.

In some embodiments, at least one of the cutting elements 20 of FIG. 1 may comprise what is often referred to the in art as a "shaped cutting element" having a non-planar front cutting face. Examples of such cutting elements are shown in FIGS. 2 through 4.

Figure 2:
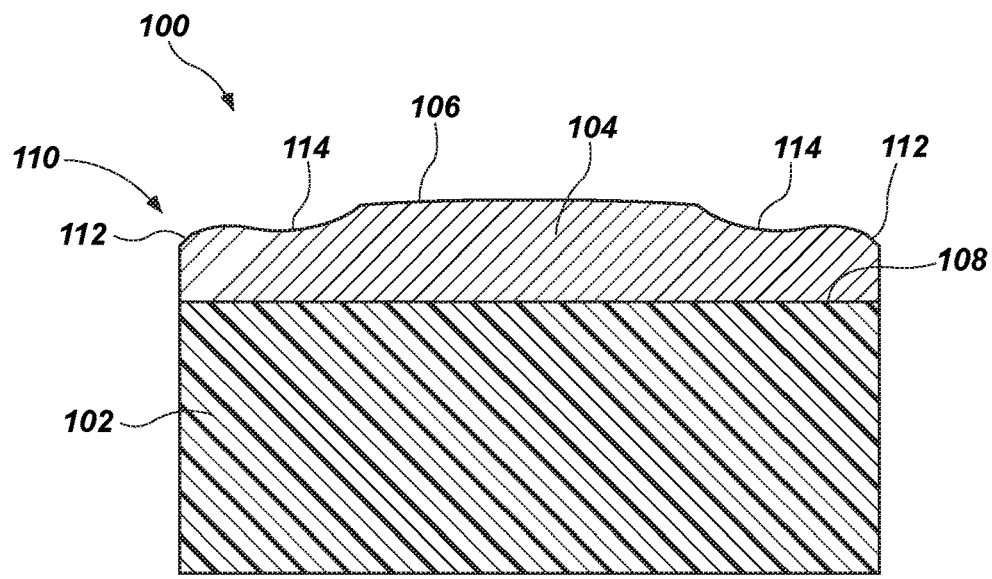
FIG. 2 is a cut-away side view of a shaped cutting element having a recessed surface in a non-planar front cutting face of a volume of superabrasive material of the cutting element.
Figure 3:
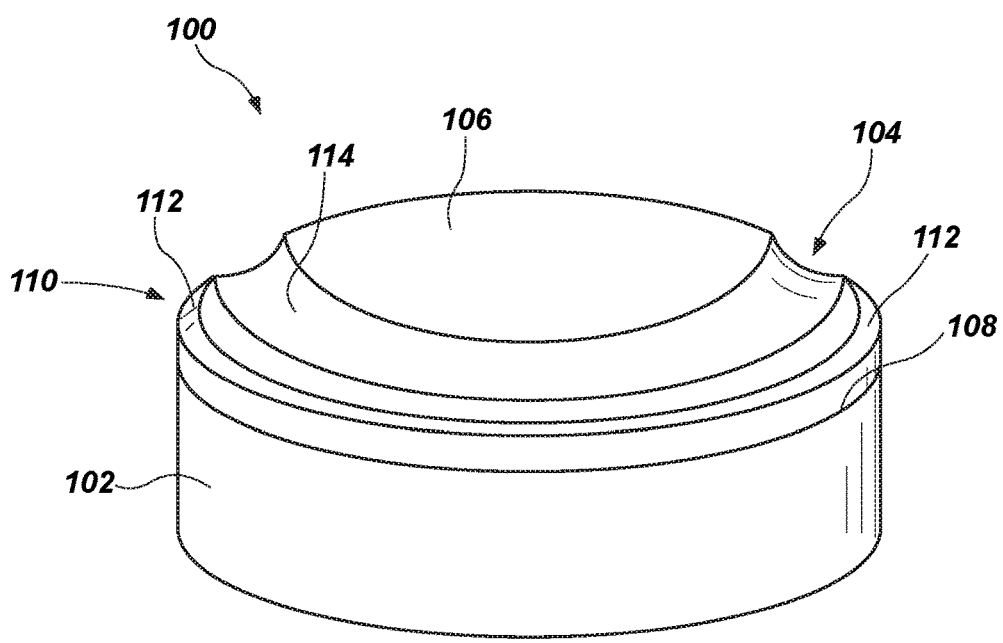
FIG. 3 is a perspective view of the cutting element of FIG. 2.
Figure 4:
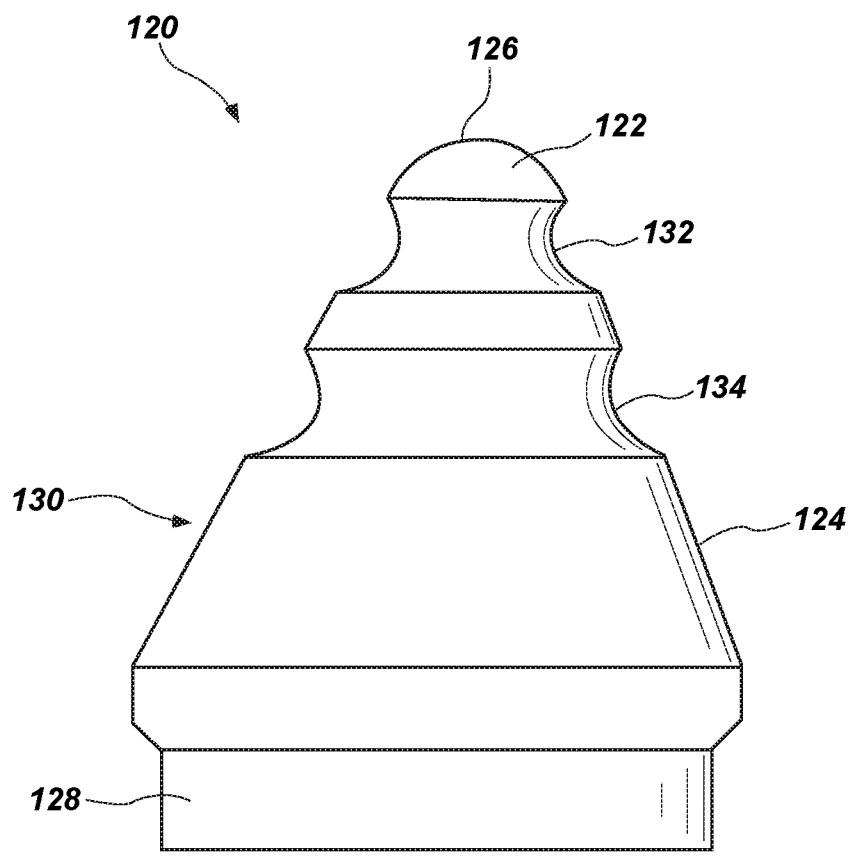
FIG. 4 is a perspective view of another shaped cutting element having recessed surfaces in a non-planar front cutting face.

For example, FIGS. 2 and 3 illustrate a shaped cutting element 100. The shaped cutting element 100 includes a cutting element substrate 102, and a volume of superabrasive material 104 on the substrate 102. The volume of superabrasive material 104 may comprise, for example, polycrystalline diamond (PCD) or polycrystalline cubic boron nitride. When the volume of superabrasive material 104 comprises diamond, the volume of superabrasive material 104 is often referred to in the art as a "diamond table." As shown in FIGS. 2 and 3, a front cutting face 106 of the volume of superabrasive material 104 is not planar, but rather has a dome shape. Stated another way, the profile of the front cutting face 106 has an arcuate, convex shape, as illustrated in the cross-sectional view of FIG. 2. Additionally, an interface 108 may be defined between the cutting element substrate 102 and the volume of superabrasive material 104. Optionally, the volume of superabrasive material 104 may have a chamfered peripheral edge 110. The chamfered peripheral edge 110 of the volume of superabrasive material 104 shown in FIGS. 2 and 3 has a single chamfer surface 112, although the chamfered peripheral edge 110 also may have additional chamfer surfaces, and such additional chamfer surfaces may be oriented at chamfer angles that differ from the chamfer angle of the chamfer surface 112, as known in the art. The cutting element substrate 102 may have a generally cylindrical shape in some embodiments, as shown in FIGS. 2 and 3. One or more arcuate, or "radiused" edges or edge portions may be employed in lieu of, or in addition to, one or more chamfered surfaces at a peripheral edge of a volume of superabrasive material, as known to those of ordinary skill in the art.

The volume of superabrasive material 104 may be formed on the cutting element substrate 102, or the volume of superabrasive material 104 and the cutting element substrate 102 may be separately formed and subsequently attached together. The cutting element substrate 102 may be formed from a material that is relatively hard and resistant to wear. For example, the cutting element substrate 102 may be formed from and include a ceramic-metal composite material (which is often referred to as a "cermet" material), such as a cemented carbide material. As one non-limiting particular embodiment, the cutting element substrate 102 may comprise a cobalt-cemented tungsten carbide material, in which tungsten carbide particles are cemented together in a metallic binder matrix comprising cobalt or a cobalt alloy. Other metals may be used as the metallic binder matrix, such as nickel, iron, or alloys thereof.

As previously mentioned, the front cutting face 106 of the volume of superabrasive material 104 may include one or more three-dimensional surface features. By way of example and not limitation, the front cutting face 106 of the volume of superabrasive material 104 may include one or more recesses as disclosed in U.S. patent application Ser. No. 13/092,396, filed Apr. 22, 2011, now U.S. Pat. No. 8,684,112, issued Apr. 1, 2014, in the name of DiGiovanni et al., and/or U.S. Provisional Patent Application Ser. No. 61/535,766, filed Sep. 16, 2011, in the name of DiGiovanni et al., each of which has been incorporated herein by reference. In other embodiments, the front cutting face 106 of the volume of superabrasive material 104 may include one or more recesses or protrusions as described in the present application.

As one non-limiting example, a recessed surface 114 may be defined in the cutting face 106 of the cutting element 100. For example, a generally annular, recessed surface 114 may be defined in the cutting face 106 of the cutting element 100, as shown in FIGS. 2 and 3. The recessed surface 114 may be positioned proximate to the chamfered peripheral edge 110 of the cutting element 100, such as proximate to the chamfer surface 112. In some embodiments, the recessed surface 114 may be arcuate and concave, as shown in FIGS. 2 and 3. The recessed surface 114 may have any shape in accordance with additional embodiments.

As non-limiting examples, the recessed surface 114 may extend a depth of between about 0.0254 mm and about 2.54 mm into the volume of superabrasive material 104 from the front cutting face 106. Additionally, the recessed surface 114 may have a width of between about 0.1 millimeter to about 10.0 millimeters, from about 0.5 millimeter to about 8.0 millimeters, or even from about 1.0 millimeter to about 5.0 millimeters. The radially outer edge of the recessed surface 114 may be positioned a distance of between about 0.1 mm and about 8.0 mm from the chamfer surface 112. The chamfered peripheral edge 110 may have a width (measured perpendicular to a central axis of the cutting element 100) of between about 0.254 mm and about 0.483 mm. In one non-limiting embodiment, the radially outer edge of the recessed surface 114 may be positioned a distance of about 1.0 mm from the chamfer surface 112, and the chamfered peripheral edge 110 may have a width of about 0.254 mm. In another non-limiting embodiment, the radially outer edge of the recessed surface 114 may be positioned a distance of about 1.2 mm from the chamfer surface 112, and the chamfered peripheral edge 110 may have a width of about 0.406 mm. In a further non-limiting embodiment, the radially outer edge of the recessed surface 114 may be positioned a distance of about 1.6 mm from the chamfer surface 112, and the chamfered peripheral edge 110 may have a width of about 0.483 mm.

As shown in FIGS. 2 and 3, the recessed surface 114 may extend circumferentially entirely around the cutting element 100 about a central axis of the cutting element 100, in an annular configuration. In additional embodiments, the recessed surface 114 may extend only partially around the cutting element 100 about the central axis thereof, and may include curved and/or linear segments. In some embodiments, the recessed surface 114 may include one or more sections that have a catenary shape (e.g., a shape of a hyperbolic cosine).

FIG. 4 illustrates another embodiment of a shaped cutting element 120 having a non-planar cutting face 122. The cutting face 122 of the cutting element 120 of FIG. 4 has a more pointed configuration relative to that of FIGS. 2 and 3, and includes a generally conical lateral side surface 124 extending to a generally domed end surface 126. The cutting element 120 also may include a cutting element substrate 128, and a volume of superabrasive material 130 on the substrate 128. The volume of superabrasive material 130 and the substrate 128 may be as previously described in relation to the volume of superabrasive material 104 and the substrate 102 of FIGS. 2 and 3. The volume of superabrasive material 130 may be sized and configured such that the cutting face 122, which comprises the generally conical lateral side surface 124 and the generally domed end surface 126, comprises exposed surfaces of the volume of superabrasive material 130.

The cutting element 120 also includes one or more three-dimensional surface features. By way of example and not limitation, the cutting face 122 of the volume of superabrasive material 130 may include one or more recesses as disclosed in U.S. patent application Ser. No. 13/092,396, now U.S. Pat. No. 8,684,112, and/or U.S. Provisional Patent Application Ser. No. 61/535,766, filed Sep. 16, 2011, each of which has been incorporated herein by reference. In other embodiments, the cutting face 122 of the volume of superabrasive material 130 may include one or more recesses or protrusions as described in the present application.

As one non-limiting example, a first recessed surface 132 and a second recessed surface 134 may be defined in the conical side surface 124 of the volume of superabrasive material 130. Each of the first and second recessed surfaces 132, 134 may be similar to the previously described recessed surface 114 of FIGS. 2 and 3, and may be arcuate and concave, as shown in FIG. 4. The recessed surfaces 132, 134 may have any shape in accordance with additional embodiments. The recessed surfaces 132, 134 may extend circumferentially entirely around the cutting element 120 about a central axis of the cutting element 120, in an annular configuration. In additional embodiments, the recessed surfaces 132, 134 may extend only partially around the cutting element 120 about the central axis thereof, and may include curved and/or linear segments.

In additional embodiments of the present disclosure, cutting elements having non-cylindrical shapes include a non-planar front cutting face on a volume of superabrasive material. Examples of such embodiments are disclosed in FIGS. 5 through 7.

Figure 5:
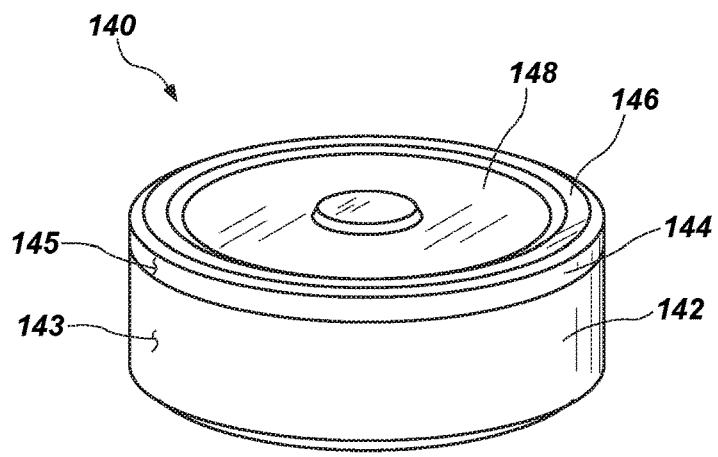
FIG. 5 is a perspective view of a cutting element having an oval shape, and which includes a recessed surface formed in a front cutting face of a volume of superabrasive material of the cutting element.
Figure 6:
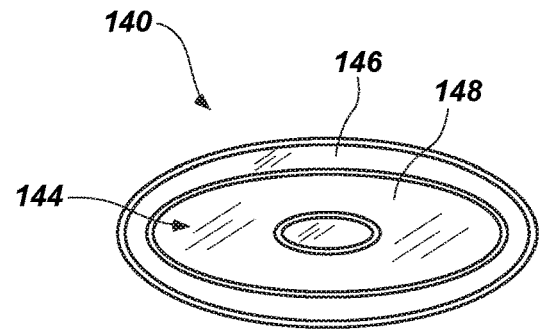
FIG. 6 is a top plan view of the front cutting face of the cutting element of FIG. 5.

A cutting element 140 is shown in FIGS. 5 and 6 that has a generally oval shape (in a plane transverse to a central axis of the cutting element 140). The cutting element 140 includes a substrate 142 and a volume of superabrasive material 144 on the substrate 142. The volume of superabrasive material 144 includes a front cutting face 146. The volume of superabrasive material 144 and the substrate 142 may be as previously described in relation to the volume of superabrasive material 104 and the substrate 102 of FIGS. 2 and 3.

As shown in FIGS. 5 and 6, the substrate 142 includes a lateral side surface 143 that has an oval or elliptical shape in a plane transverse to a central axis of the cutting element 140. The volume of superabrasive material 144 also may have a lateral side surface 145 having an oval or elliptical shape in a plane transverse to a central axis of the cutting element 140. The lateral side surface 145 of the volume of superabrasive material 144 may be coextensive and continuous with the lateral side surface 143 of the substrate 142.

The cutting face 146 of the volume of superabrasive material 144 of the cutting element 140 also includes one or more three-dimensional surface features. By way of example and not limitation, the cutting face 146 of the volume of superabrasive material 144 may include one or more recesses as disclosed in U.S. patent application Ser. No. 13/092,396, now U.S. Pat. No. 8,684,112, and/or U.S. Provisional Patent Application Ser. No. 61/535,766, filed Sep. 16, 2011, each of which has been incorporated herein by reference. In other embodiments, the cutting face 146 of the volume of superabrasive material 144 may include one or more recesses or protrusions as described in the present application.

As one non-limiting example, a recessed surface 148 may be defined in the cutting face 146 of the volume of superabrasive material 144. The recessed surface 148 may be similar to the previously described recessed surface 114 of FIGS. 2 and 3. The recessed surface 148, however, may be generally planar and oriented at least substantially transverse to a central axis of the cutting element 140, as shown in FIGS. 5 and 6. The recessed surface 148 may have any shape in accordance with additional embodiments. The recessed surface 148 may extend circumferentially entirely around the cutting element 140 about a central axis of the cutting element 140 in an annular configuration. In additional embodiments, the recessed surface 148 may extend only partially around the cutting element 140 about the central axis thereof, and may include curved and/or linear segments.

Although the cutting element 140 of FIGS. 5 and 6 has an oval or elliptical shape in a plane transverse to a central axis of the cutting element 140, additional embodiments of cutting elements according to the present disclosure may have any other shape, including a circular shape, a triangular shape, a rectangular shape, a tombstone shape, etc., in planes transverse to central axes of the cutting elements.

Figure 7:
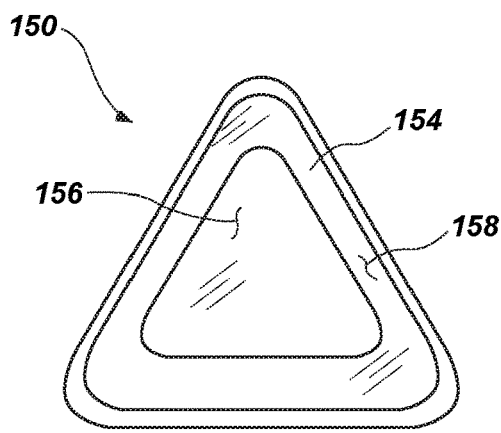
FIG. 7 is a top plan view like that of FIG. 6 illustrating another cutting element having a triangular shape, and which includes a recessed surface in a front cutting face of a volume of superabrasive material of the cutting element.

FIG. 7 is a top view like that of FIG. 6 illustrating another cutting element 150 having a triangular shape in a plane transverse to a central axis of the cutting element 150. The cutting element 150 may include a substrate (not shown) and a volume of superabrasive material 154 on the substrate. The volume of superabrasive material 154 includes a front cutting face 156. The volume of superabrasive material 154 and the substrate may be as previously described in relation to the volume of superabrasive material 104 and the substrate 102 of FIGS. 2 and 3. The substrate and the volume of superabrasive material 154 each may include a lateral side surface having a generally triangular shape in a plane transverse to a central axis of the cutting element 150 (i.e., in the plane of the view of FIG. 7).

The cutting face 156 of the volume of superabrasive material 154 of the cutting element 150 also includes one or more three-dimensional surface features. By way of example and not limitation, the cutting face 156 of the volume of superabrasive material 154 may include one or more recesses as disclosed in U.S. patent application Ser. No. 13/092,396, now U.S. Pat. No. 8,684,112, and/or U.S. Provisional Patent Application Ser. No. 61/535,766, filed Sep. 16, 2011, each of which has been incorporated herein by reference. In other embodiments, the cutting face 156 of the volume of superabrasive material 154 may include one or more recesses or protrusions as described in the present application.

As one non-limiting example, a recessed surface 158 may be defined in the cutting face 156 of the volume of superabrasive material 154. The recessed surface 158 may be generally planar and oriented at least substantially transverse to a central axis of the cutting element 150, as shown in FIG. 7. The recessed surface 158 may extend in along a triangular pathway proximate the peripheral cutting edge of the triangular-shaped cutting element 150, and may be generally centered along the central axis of the cutting element 150, as shown in FIG. 7. The recessed surface 158 may have any other shape in accordance with additional embodiments.

Figure 8:
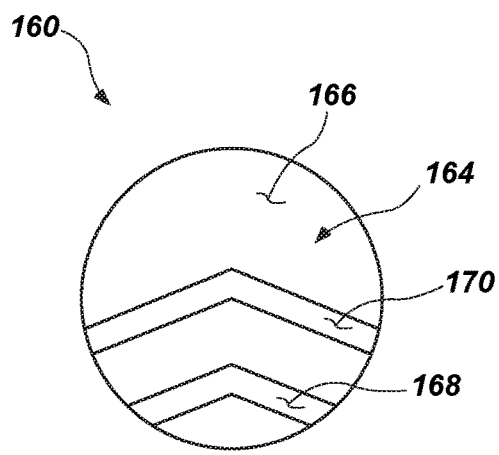
FIG. 8 is a top plan view like that of FIG. 6 illustrating another cutting element that includes two chevron-shaped recessed surfaces in a front cutting face of a volume of superabrasive material of the cutting element.
Figure 9:
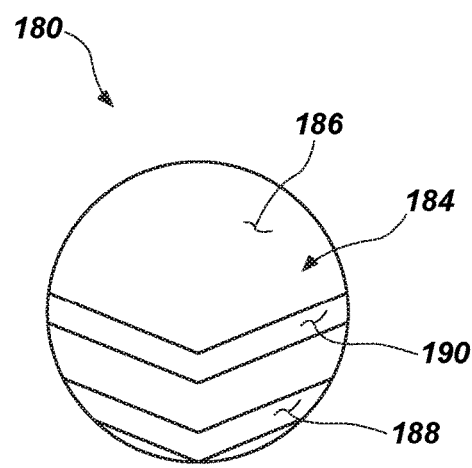
FIG. 9 is a top plan view of another cutting element including two chevron-shaped recessed surfaces in a front cutting face of a volume of superabrasive material of the cutting element, which are oriented differently on the cutting face from the chevron-shaped recessed surfaces of the cutting element of FIG. 8.
Figure 10:
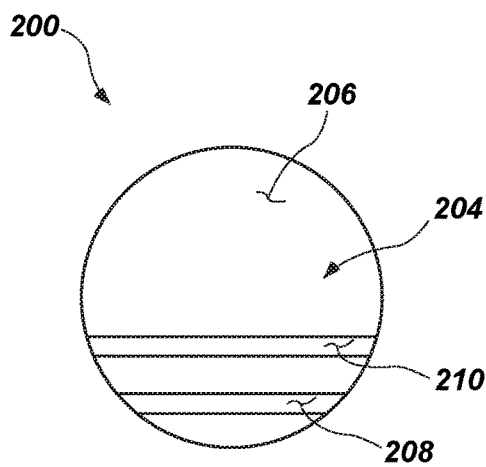
FIG. 10 is a top plan view of another cutting element that includes two linear recessed surfaces in a front cutting face of a volume of superabrasive material of the cutting element.

The recessed surface 114 of FIGS. 2 and 3, the recessed surfaces 132 and 134 of FIG. 4 and the recessed surface 148 of FIGS. 5 and 6 are curved in shape. The cutting element 150 of FIG. 7 includes a recessed surface 158 having linear segments. Thus, cutting elements according to the present disclosure may include features on a front cutting face of a volume of superabrasive material, wherein the features include one or more linear recessed surfaces, or recessed surfaces having one or more linear segments. FIGS. 8 through 10 illustrate additional examples of such embodiments.

Referring to FIG. 8, a cutting element 160 comprising a volume of superabrasive material 164 is illustrated. The cutting element 160 may include a substrate (not shown) and a volume of superabrasive material 164 on the substrate. The volume of superabrasive material 164 includes a front cutting face 166. The volume of superabrasive material 164 and the substrate may be as previously described in relation to the volume of superabrasive material 104 and the substrate 102 of FIGS. 2 and 3. The cutting face 166 of the volume of superabrasive material 164 of the cutting element 160 also includes one or more three-dimensional surface features that include at least one linear segment. By way of example and not limitation, the cutting face 166 of the volume of superabrasive material 164 may include one or more recesses as previously discussed, but wherein the recesses include at least one linear segment. As one non-limiting example, a first recessed surface 168 and a second recessed surface 170 may be defined in the cutting face 166 of the volume of superabrasive material 164. The recessed surfaces 168, 170 may have a chevron shape in a lateral plane transverse to a central axis of the cutting element 160, as shown in FIG. 8. Thus, each recessed surface 168, 170 includes a first linear segment on a first side of an apex of the chevron-shaped recessed surface 168, 170, and a second linear segment on a second side of the apex of the chevron-shaped recessed surface 168, 170. The apex of each chevron-shaped recessed surface 168, 170 may be located along a line intersecting a central axis of the cutting element 160, as shown in FIG. 8. Thus, the chevron-shaped recessed surface 168, 170 may be axi-symmetric in some embodiments. The chevron-shaped recessed surface 168, 170 may not be axi-symmetric in other embodiments. In the embodiment of FIG. 8, the recessed surfaces 168, 170 are at least substantially located on one half of the front cutting face 166 of the volume of superabrasive material 164, and the apex of each chevron-shaped recessed surface 168, 170 points radially inward toward the opposing half of the front cutting face 166 of the volume of superabrasive material 164.

FIG. 9 illustrates another embodiment of a cutting element 180 that is generally similar to the cutting element 160 of FIG. 8. The cutting element 180 may include a substrate (not shown) and a volume of superabrasive material 184 on the substrate. The volume of superabrasive material 184 includes a front cutting face 186. The volume of superabrasive material 184 and the substrate may be as previously described in relation to the volume of superabrasive material 104 and the substrate 102 of FIGS. 2 and 3. The cutting face 186 of the volume of superabrasive material 184 of the cutting element 180 also includes a first recessed surface 188 and a second recessed surface 190 defined in the cutting face 186 of the volume of superabrasive material 184. The recessed surfaces 188, 190 have a chevron shape in a lateral plane transverse to a central axis of the cutting element 180, as shown in FIG. 9. Thus, each recessed surface 188, 190 includes a first linear segment on a first side of an apex of the chevron-shaped recessed surface 188, 190, and a second linear segment on a second side of the apex of the chevron-shaped recessed surface 188, 190. The apex of each chevron-shaped recessed surface 188, 190 may be located along a line intersecting a central axis of the cutting element 180, as shown in FIG. 9. In the embodiment of FIG. 9, the recessed surfaces 188, 190 are at least substantially located on one half of the front cutting face 186 of the volume of superabrasive material 184, and the apex of each chevron-shaped recessed surface 188, 190 points radially outward from a central axis of the cutting element 180.

FIG. 10 illustrates another embodiment of a cutting element 200, which may include a substrate (not shown) and a volume of superabrasive material 204 on the substrate. The volume of superabrasive material 204 includes a front cutting face 206. The volume of superabrasive material 204 and the substrate may be as previously described in relation to the volume of superabrasive material 104 and the substrate 102 of FIGS. 2 and 3. The cutting face 206 of the volume of superabrasive material 204 of the cutting element 200 also includes a first linear recessed surface 208 and a second linear recessed surface 210 defined in the cutting face 206 of the volume of superabrasive material 204. The recessed surfaces 208, 210 extend linearly across the cutting face 206 of the volume of superabrasive material 204, as shown in FIG. 10. The recessed surfaces 208, 210 may extend at least substantially parallel to one another as shown in FIG. 10. In other embodiments, they may be oriented at an angle relative to one another.

The cutting elements of embodiments of FIGS. 8 through 10 each include two recessed surfaces. In additional embodiments, any of the cutting elements may include one, three, or any number of recessed surfaces in the cutting face of the volume of superabrasive material. Additionally, in embodiments of cutting elements that include two or more recessed surfaces in the cutting face of the volume of superabrasive material, the recessed surfaces may be located at the same, common depth within the volume of superabrasive material, or the recessed surfaces may be located at different depths within the volume of superabrasive material. Further, in embodiments of cutting elements that include two or more recessed surfaces in the cutting face of the volume of superabrasive material, the recessed surfaces may have the same cross-sectional shape, or the recessed surfaces may have different cross-sectional shapes.

Figure 11:
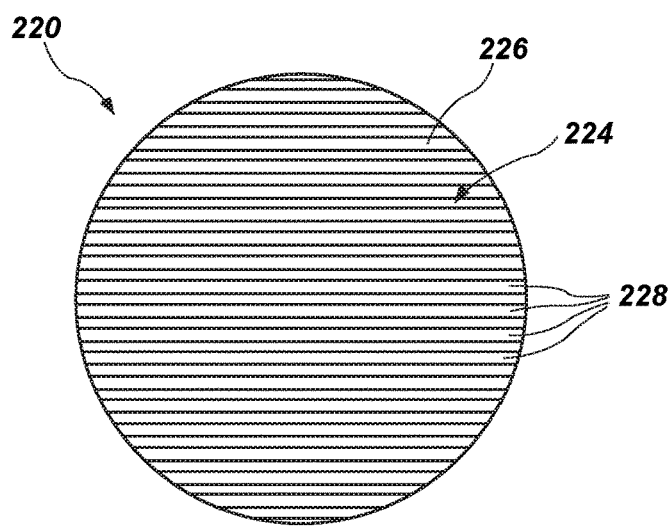
FIG. 11 is a top plan view of another cutting element that includes a plurality of linear recessed surfaces in a front cutting face of a volume of superabrasive material of the cutting element, wherein the recessed surfaces are disposed across an entirety of the cutting face.
Figure 12:
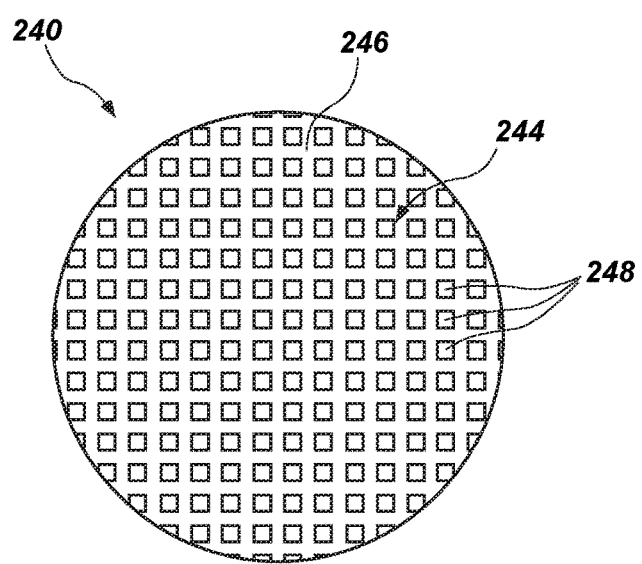
FIG. 12 is a top plan view of another cutting element that includes a plurality of discrete, laterally isolated recessed surfaces in a front cutting face of a volume of superabrasive material of the cutting element, wherein the recessed surfaces are disposed across an entirety of the cutting face.

In additional embodiments of cutting elements of the present disclosure, the cutting elements may include features disposed in a front cutting face of a volume of superabrasive material, wherein the features extend generally across an entirety of the cutting face. FIGS. 11 and 12 illustrate examples of such embodiments.

FIG. 11 illustrates another embodiment of a cutting element 220, which may include a substrate (not shown) and a volume of superabrasive material 224 on the substrate. The volume of superabrasive material 224 includes a front cutting face 226. The volume of superabrasive material 224 and the substrate may be as previously described in relation to the volume of superabrasive material 104 and the substrate 102 of FIGS. 2 and 3. The cutting face 226 of the volume of superabrasive material 224 of the cutting element 220 also includes a plurality of linear recessed surfaces 228 defined in the cutting face 226 of the volume of superabrasive material 224. The recessed surfaces 228 extend linearly across the cutting face 226 of the volume of superabrasive material 224, as shown in FIG. 11. The recessed surfaces 228 may extend at least substantially parallel to one another as shown in FIG. 11. In other embodiments, they may be oriented at an angle to one another. For example, in another embodiment, each of the recessed surfaces 228 may extend in a radial direction from a location proximate the central axis of the cutting element to the outer peripheral edge of the cutting element, in a configuration similar to spokes of a wheel.

FIG. 12 illustrates another embodiment of a cutting element 240, which may include a substrate (not shown) and a volume of superabrasive material 244 on the substrate. The volume of superabrasive material 244 includes a front cutting face 246. The volume of superabrasive material 244 and the substrate may be as previously described in relation to the volume of superabrasive material 104 and the substrate 102 of FIGS. 2 and 3. The cutting face 246 of the volume of superabrasive material 244 of the cutting element 240 also includes a plurality of recessed surfaces 248 defined in the cutting face 246 of the volume of superabrasive material 244. The recessed surfaces 248 each comprise a discrete, rectangular-shaped recess. The recessed surfaces 248 are laterally isolated from one another. The recessed surfaces 248 are disposed across the entire cutting face 246 of the volume of superabrasive material 244, as shown in FIG. 12. In some embodiments, the recessed surfaces 248 may be disposed in an ordered array, such as in a plurality of rows and columns, as shown in FIG. 12. In other embodiments, they may be randomly located across the cutting face 246 of the volume of superabrasive material 244.

As a non-limiting example, the recessed surfaces of FIGS. 11 and 12 may have average cross-sectional dimensions of between about 0.1 micron and about 500 microns, between about 10.0 microns and about 400 microns, or even between about 100 microns and about 300 microns.

In the embodiments of cutting elements described with reference to FIGS. 2 through 12, the non-planar front cutting faces on the volumes of superabrasive material include recesses that extend into the volumes of superabrasive material from the major surfaces of the volumes of superabrasive material. In additional embodiments of the present disclosure, cutting elements may include non-planar front cutting faces on volumes of superabrasive material having protrusions that extend outward from major surfaces of the volumes of superabrasive material. For example, additional embodiments of the present disclosure include cutting elements like those of FIGS. 2 through 12, but wherein the cutting elements include protrusions instead of recessed surfaces. The protrusions may have cross-sectional geometries defined by mirror images of the recesses reflected across the surfaces defined by the front cutting faces of the volumes of superabrasive material. Additional examples of cutting elements that include protrusions that project outwardly from a front cutting face of a volume of superabrasive material are described below with reference to FIGS. 13 through 15.

Figure 13:
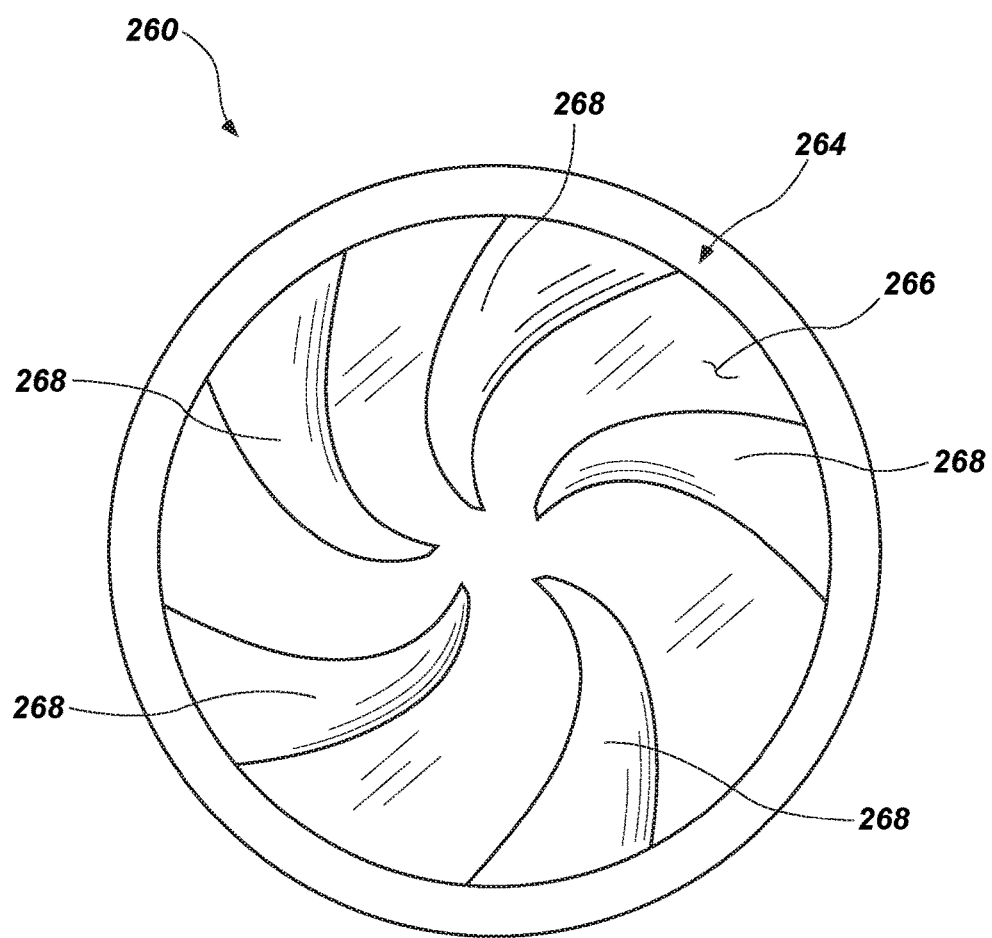
FIG. 13 is a top plan view of another cutting element that includes a plurality of helically extending protrusions extending outward from a front cutting face of a volume of superabrasive material of the cutting element.

FIG. 13 illustrates another embodiment of a cutting element 260, which may include a substrate (not shown) and a volume of superabrasive material 264 on the substrate. The volume of superabrasive material 264 includes a front cutting face 266. The volume of superabrasive material 264 and the substrate may be as previously described in relation to the volume of superabrasive material 104 and the substrate 102 of FIGS. 2 and 3. The cutting face 266 of the volume of superabrasive material 264 of the cutting element 260 also includes a plurality of protrusions 268 that extend outward from the cutting face 266 of the volume of superabrasive material 264. As shown in FIG. 13, each of the protrusions 268 may extend in a generally helical direction from a location proximate a central axis of the cutting element 260 to the circumferential periphery of the cutting element 260. In the embodiment of FIG. 13, each of the protrusions 268 has a rounded outer surface. In other embodiments, each protrusion 268 may have a generally planar outer surface. Additionally, in the embodiment of FIG. 13, each of the protrusions 268 has a width that increases in the direction extending along the protrusion 268 from the location proximate the central axis of the cutting element 260 to the circumferential periphery of the cutting element 260. In other embodiments, the width of each protrusion 268 may be constant, or may decrease in the direction extending along the protrusion 268 from the location proximate the central axis of the cutting element 260 to the circumferential periphery of the cutting element 260. The cutting element 260 includes five (5) protrusions, but other embodiments may have one or more protrusions. For example, another embodiment may have a single protrusion, similar to the protrusion 268, extending in a helical manner from a location proximate a central axis of the cutting element 260 to the circumferential periphery of the cutting element 260. Such a single helical protrusion may complete less than one complete circle as it extends helically around a central axis of the cutting element 260, or it may complete one or more complete circles. In additional embodiments, cutting elements as described with reference to FIG. 13 may be formed to include recessed surfaces in place of the protrusions 268, wherein the recessed surfaces have geometries defined by the mirror image of the protrusions 268 reflected across the surface of the cutting face 266 of the volume of superabrasive material 264, or alternating protrusions and recesses as previously described.

A Cartesian coordinate system having x, y, and z axes (at right angles to one another) may be defined to align the z-axis with the central axis of the cutting element 260. Orthogonal planes may be defined by the x-y, the x-z, and the y-z planes. The coordinate system may also be defined to position the center (i.e., the intersection of the x, y, and z axes) on the central axis. In some embodiments, the protrusions 268 may be rotationally asymmetric about the central z-axis. In some embodiments, the protrusions 268 may be reflectively asymmetric (also referred to as "mirror asymmetry," "mirror-image asymmetry," and "bilateral asymmetry") about at least two of the x-y, the x-z, and the y-z planes. In other words, a first half of a protrusion 268 may not comprise a symmetric mirror image projection of a second half of the protrusion 268 when divided by at least two of the x-y, the x-z, and the y-z planes. In other embodiments, the asymmetric protrusions 268 may be reflectively asymmetric about each of the x-y, the x-z, and the y-z planes. In addition, the asymmetric protrusions 268 may comprise a combination of rotational and reflective asymmetry. Furthermore, the asymmetric protrusions 268 may be rotationally and reflectively asymmetric about all planes and axes intersecting with the substrate. The protrusions and/or recesses on the front cutting face of other embodiments of cutting elements as described previously and subsequently herein may similarly exhibit such asymmetry.

Figure 14:
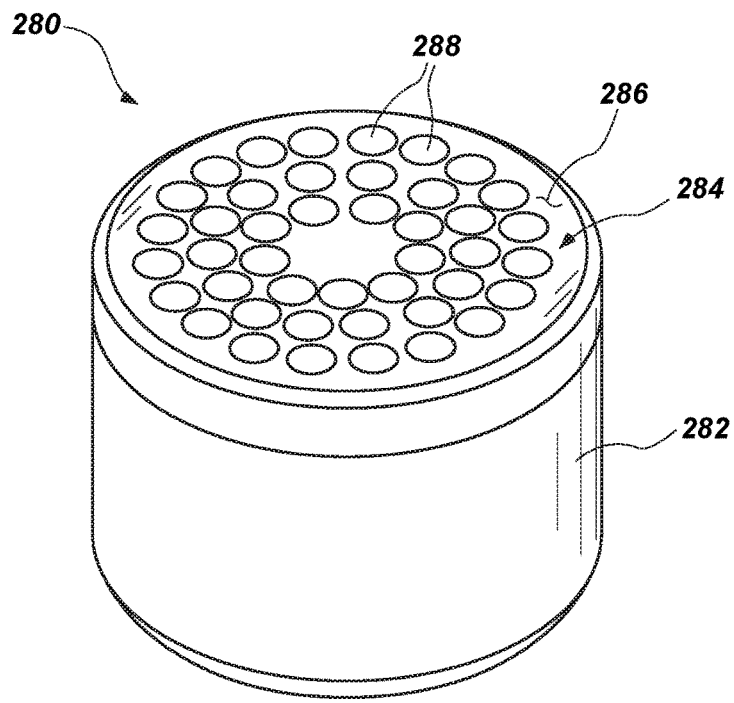
FIG. 14 is a perspective view of another cutting element that includes a plurality of discrete, laterally isolated protrusions that extend outwardly from a front cutting face of a volume of superabrasive material of the cutting element.
Figure 15:
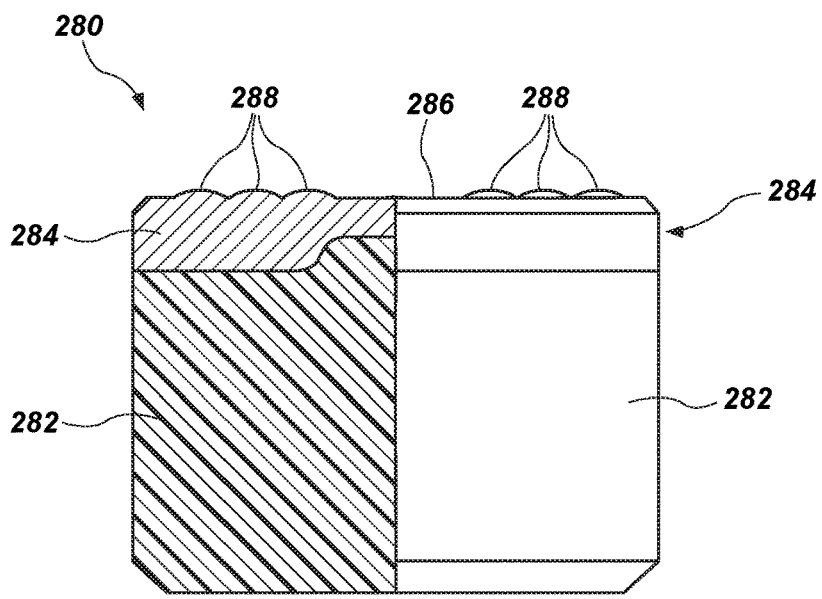
FIG. 15 is a partial cross-sectional side view of the cutting element of FIG. 14.

FIGS. 14 and 15 illustrate another embodiment of a cutting element 280 that includes protrusions extending outwardly from a cutting face thereof. The cutting element 280 may include a substrate 282 and a volume of superabrasive material 284 on the substrate 282. The volume of superabrasive material 284 includes a front cutting face 286. The volume of superabrasive material 284 and the substrate 282 may be as previously described in relation to the volume of superabrasive material 104 and the substrate 102 of FIGS. 2 and 3. The cutting face 286 of the volume of superabrasive material 284 of the cutting element 280 also includes a plurality of protrusions 288 that extend outward from the cutting face 286 of the volume of superabrasive material 284. As shown in FIGS. 14 and 15, each of the protrusions 288 may comprise a discrete protrusion 288 that is laterally isolated from the other protrusions 288. The protrusions 288 may be disposed in an ordered array across the cutting face 286, or they may be randomly located on the cutting face 286. In the embodiment of FIGS. 14 and 15, each of the protrusions 288 has a rounded outer surface, which may comprise a portion of a sphere (e.g., a hemisphere). The protrusions 288 may have other shapes in further embodiments. In additional embodiments, cutting elements as described with reference to FIGS. 14 and 15 may be formed to include recessed surfaces in place of the protrusions 288, wherein the recessed surfaces have geometries defined by the mirror images of the protrusions 288 reflected across the surface of the cutting face 286 of the volume of superabrasive material 284.

In additional embodiments of the present disclosure, cutting elements having recesses and/or protrusions at a cutting face of a volume of superabrasive material, such as the cutting elements described above with reference to FIGS. 2 through 15, may further include one or more recessed surfaces that extend into a lateral side surface of the volume of superabrasive material. A non-limiting example of such a cutting element is described below with reference to FIGS. 16 and 17.

Figure 16:
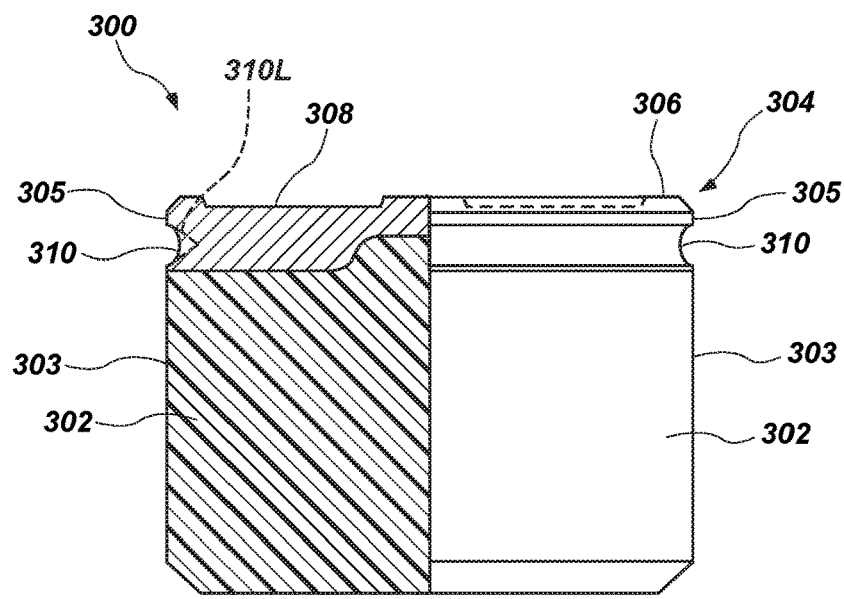
FIG. 16 is a partial cross-sectional side view of another cutting element that includes a recessed surface in a front cutting face of a volume of superabrasive material of the cutting element, and that includes another recessed surface extending into the volume of superabrasive material from a lateral side surface of the volume of superabrasive material.
Figure 17:
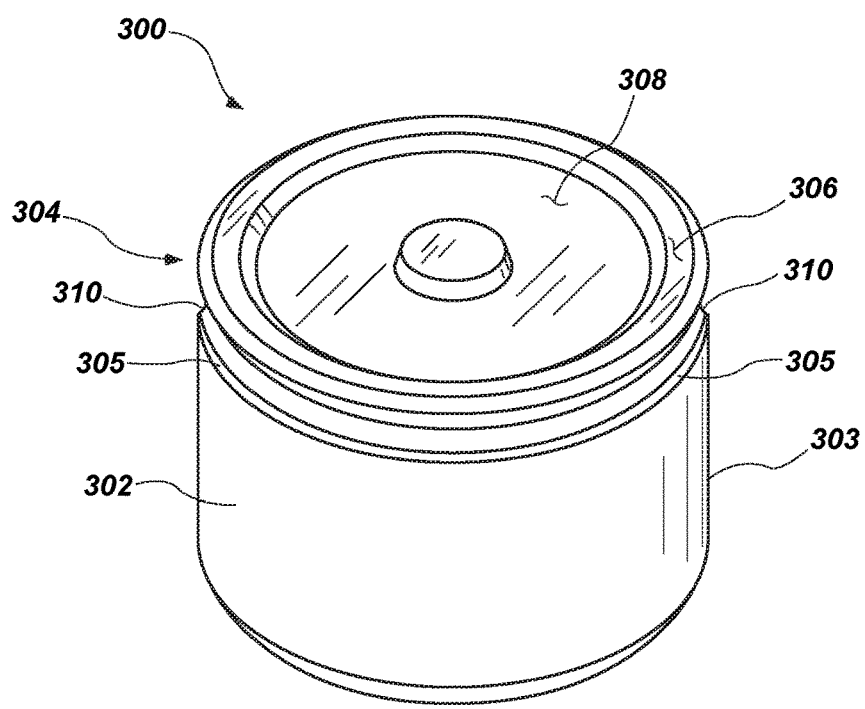
FIG. 17 is a perspective view of the cutting element of FIG. 16.

FIGS. 16 and 17 illustrate a cutting element 300 that includes a substrate 302 and a volume of superabrasive material 304 on the substrate 302. The volume of superabrasive material 304 includes a front cutting face 306. The volume of superabrasive material 304 and the substrate 302 may be as previously described in relation to the volume of superabrasive material 104 and the substrate 102 of FIGS. 2 and 3. As shown in FIGS. 16 and 17, the substrate 302 includes a lateral side surface 303, and the volume of superabrasive material 304 has a lateral side surface 305. The lateral side surface 305 of the volume of superabrasive material 304 may be coextensive and continuous with the lateral side surface 303 of the substrate 302. The cutting face 306 of the volume of superabrasive material 304 of the cutting element 300 also includes one or more three-dimensional surface features. As one non-limiting example, a recessed surface 308 may be defined in the cutting face 306 of the volume of superabrasive material 304. The recessed surface 308 may be similar to the previously described recessed surface 148 of FIGS. 5 and 6. The recessed surface 308 may have any other configuration as described herein in accordance with additional embodiments, and the cutting element 300 may include one or more protrusions that project outward from the cutting face 306 in place of the recessed surface 308, or in addition to the recessed surface 308.

As shown in FIGS. 16 and 17, the cutting element 300 further includes at least one recessed surface 310 that extends into the volume of superabrasive material 304 from the lateral side surface 305 of the volume of superabrasive material 304. The recessed surface 310 may extend circumferentially around the entire lateral periphery of the volume of superabrasive material 304 in some embodiments. In the embodiment shown in FIGS. 16 and 17, the recessed surface 310 has an arcuate cross-sectional shape. In other embodiments, the recessed surface 310 may be defined by a plurality of surfaces that are planar in one dimension (e.g., the vertical or horizontal dimension within the plane of FIG. 16), as depicted in broken lines 310L. As shown in FIGS. 16 and 17, the recessed surface 310 may extend only into the volume of superabrasive material 304, and not into any portion of the substrate 302. In other embodiments, a portion of the recessed surface 310 may also extend into the substrate 302. In other words, the recessed surface 310 may extend across the interface between the volume of superabrasive material 304 and the substrate 302.

The recessed surface 310 may result in the formation of a radially extending lip at a wear scar formed on the cutting element 300 during drilling. Such a radially extending lip is often referred to in the art as a "shear lip," and may result in concentrated stresses in the regions of the formation adjacent the shear lip, as they are sheared away and removed by the cutting element during drilling. Improved cutting efficiency may result from such a concentration of stresses caused by the presence of such a lip at the wear scar extending into the formation.

Cutting elements according to the present disclosure, such as any of the cutting elements described with reference to FIGS. 2 through 17, may be formed to include one or more fluid passageways that extend through the cutting element to the cutting face on the volume of superabrasive material. An example of such a cutting element is shown below with reference to FIG. 18.

Figure 18:
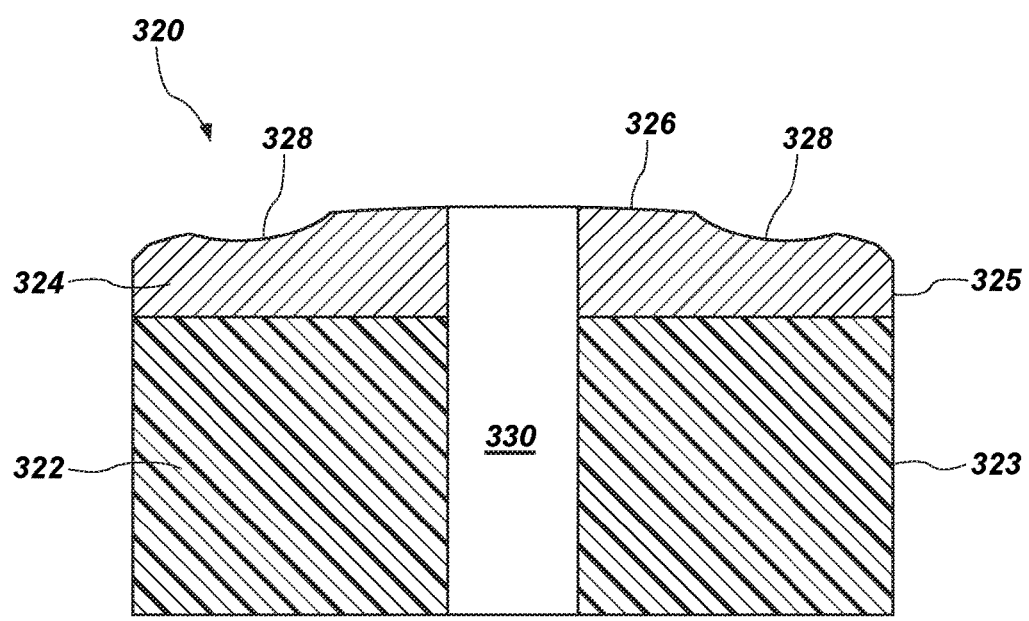
FIG. 18 is a cross-sectional side view of another cutting element having a recessed surface in a front cutting face of a volume of superabrasive material of the cutting element, and further including a fluid passageway extending through the cutting element to the front cutting face of the volume of superabrasive material.

FIG. 18 is a cross-sectional view of a cutting element 320 that is substantially similar to the cutting element 100 of FIGS. 2 and 3. The cutting element 320 includes a substrate 322 and a volume of superabrasive material 324 on the substrate 322. The volume of superabrasive material 324 includes a domed front cutting face 326. The volume of superabrasive material 324 and the substrate 322 may be as previously described in relation to the volume of superabrasive material 104 and the substrate 102 of FIGS. 2 and 3. As shown in FIG. 18, the substrate 322 includes a lateral side surface 323, and the volume of superabrasive material 324 has a lateral side surface 325. The lateral side surface 325 of the volume of superabrasive material 324 may be coextensive and continuous with the lateral side surface 323 of the substrate 322. The cutting face 326 of the volume of superabrasive material 324 of the cutting element 320 also includes one or more three-dimensional surface features. As one non-limiting example, a recessed surface 328 may be defined in the cutting face 326 of the volume of superabrasive material 324. The recessed surface 328 may be similar to the previously described recessed surface 114 of FIGS. 2 and 3. The recessed surface 328 may have any other configuration as described herein in accordance with additional embodiments, and the cutting element 320 may include one or more protrusions that project outward from the cutting face 326 in place of the recessed surface 328, or in addition to the recessed surface 328.

As shown in FIG. 18, the cutting element 320 further includes a fluid passageway 330. The fluid passageway 330 may be used to allow drilling fluid to flow through the fluid passageway 330 to the cutting face 326 during use of the cutting element 320 in a drilling operation, which fluid flow may assist in removal of formation cuttings from the cutting face 326. Thus, formation cuttings may be hindered or precluded from sticking to the cutting face 326, which may reduce the occurrence of what is referred to as "balling" of a drill bit or other tool to which the cutting element 320 is attached. The fluid passageway 330 may be aligned with a complementary and corresponding fluid passageway extending through a body of an earth-boring tool, such as a rotary drill bit like that previously described with reference to FIG. 1, such that a portion of drilling fluid caused to flow through the body of the earth-boring tool during drilling will flow into and through the fluid passageway 330 extending through the cutting element 320.

As shown in FIG. 18, the fluid passageway 330 extends through the substrate 322 and through the volume of superabrasive material 324 to the domed front cutting face 326 of the volume of superabrasive material 324. In some embodiments, the fluid passageway may extend along the central axis of the cutting element 320, although the fluid passageway 330 may be located elsewhere within the cutting element 320 in other embodiments. The fluid passageway 330 may be straight or curved. The cutting element 320 shown in FIG. 18 includes a single fluid passageway 330. In other embodiments, a plurality of relatively smaller fluid passageways 330 may extend through the cutting element 320 to the cutting face 326.

Cutting elements including volumes of superabrasive material having features as described hereinabove may be fabricated using any number of techniques. As known in the art, the volume of superabrasive material may be formed by subjecting superabrasive grains (e.g., diamond or cubic boron nitride grains) to an HTHP sintering process in which direct, inter-granular atomic bonds are formed between the grains. A catalyst, such as a metal solvent catalyst (e.g., cobalt, iron, nickel, or an alloy of one or more such metals), may be employed to assist in the formation of the inter-granular atomic bonds. In such HTHP sintering processes, the grains are provided within a container, which is then subjected to elevated temperatures (e.g., a temperature greater than about 1,300° C.) and elevated pressures (e.g., a pressure greater than about 5.0 GPa). Sintering presses for carrying out such HTHP sintering processes are commercially available.

The recesses and/or protrusions at the cutting face (and, optionally, the lateral side surface) of the volume of polycrystalline diamond material) may be formed in situ during the HTHP sintering process. For example, an insert having a geometry corresponding to a recess to be formed in a volume of superabrasive material may be selectively positioned within a container in which superabrasive grains are to be subjected to an HTHP sintering process. The insert may comprise a material that will retain its shape throughout the HTHP sintering process, and that will not degrade or otherwise detrimentally affect the surrounding superabrasive material during the HTHP sintering process. By way of example and not limitation, the insert may comprise a ceramic, such as an oxide material (e.g., magnesium oxide (MgO)). Superabrasive grains may be positioned within the container around the insert. Optionally, a substrate, such as the substrate 102 of FIGS. 2 and 3, may be positioned within the container adjacent the superabrasive grains. Catalyst material may be supplied from the substrate, or may be provided within the superabrasive grains in the form of, for example, powdered catalyst material. The container may be subjected to an HTHP sintering process with the insert, the superabrasive grains, and an optional substrate contained therein to sinter the superabrasive grains and form a volume of superabrasive material within the container and around the insert. After the HTHP sintering process, the insert may be removed to form protrusions or recesses on or in surfaces of the volume of superabrasive material. Alternatively, the insert may be left in place on or in the volume of superabrasive material. During use of the resulting cutting element in a drilling operation, the material of the insert will abrade and/or erode away relatively rapidly during the initial stage of cutting, thereby resulting in a cutting element including a volume of superabrasive material having recesses and/or protrusions as described herein.

As another example of a method that may be employed to form the recesses and/or protrusions at the cutting face of the volume of superabrasive material, the volume of superabrasive material may be formed on a surface of a first sacrificial substrate in an HTHP sintering process. The surface of the first sacrificial substrate on which the volume of superabrasive material is formed may be sized, shaped, and configured such that the interface between the volume of superabrasive material and the first sacrificial substrate has the size, shape, and configuration of the desired front cutting face for the volume of superabrasive material. After forming the volume of superabrasive material, the volume of superabrasive material may be removed from the first sacrificial substrate, inverted, and attached to a second substrate to form the cutting element. By inverting the superabrasive material, the surface of the volume of superabrasive material that was disposed at the interface with the first sacrificial substrate becomes the front cutting face of the volume of superabrasive material upon attachment of the volume of superabrasive material to the second substrate. The volume of superabrasive material may be attached to the second substrate using, for example, a brazing process, or by positioning the volume of superabrasive material on the second substrate in a container and subjecting the volume of superabrasive material and the second substrate to another HTHP sintering process to sinterbond the volume of superabrasive material to the second substrate. The second substrate may comprise a cemented tungsten carbide substrate, or another volume of superabrasive material (e.g., polycrystalline diamond), for example.

In additional embodiments, the recesses and/or protrusions formed in the surfaces of the volume of superabrasive material, as described in relation to the cutting elements of FIGS. 2 through 18, may be formed in and/or on the volume of superabrasive material after forming the superabrasive material in an HTHP sintering process. For example, a volume of superabrasive material without any such recesses and/or protrusions may be fabricated using an HTHP sintering process as previously described, after which the recesses and/or protrusions may be formed in and/or on the volume of superabrasive material.

For example, a laser ablation process may be used to remove selected, localized regions of the volume of superabrasive material, and may be used to form recesses and/or protrusions, as described herein, in or on the volume of superabrasive material. As another example, and electrodischarge machining process may be used to remove selected, localized regions of the volume of superabrasive material, and may be used to form recesses and/or protrusions, as described herein, in or on the volume of superabrasive material. Mechanical machining processes also may be used to remove selected, localized regions of the volume of superabrasive material, and may be used to form recesses and/or protrusions. Such mechanical machining processes include, for example, milling processes, turning processes, drilling processes, grinding processes, etc. In yet further embodiments, a laser may be used to degrade and weaken selected, localized regions of the volume of superabrasive material, after which one or more mechanical machining processes may be used to remove the degraded and weakened regions of the volume of superabrasive material.

Optionally, any catalyst material present in interstitial spaces between superabrasive grains in the volume of superabrasive material of any of the cutting elements described hereinabove in relation to FIGS. 2 through 18 may be removed from the volume of superabrasive material after the HTHP sintering process, as known in the art. For example, a leaching process may be used to remove catalyst material from interstitial spaces between the inter-bonded superabrasive grains of the volume of superabrasive material. By way of example and not limitation, the volume of superabrasive material may be leached using a leaching agent and process such as those described more fully in, for example, U.S. Pat. No. 5,127,923 to Bunting et al. (issued Jul. 7, 1992), and U.S. Pat. No. 4,224,380 to Bovenkerk et al. (issued Sep. 23, 1980), the disclosure of each of which patent is incorporated herein in its entirety by this reference. Specifically, aqua regia (a mixture of concentrated nitric acid ($HNO_3$) and concentrated hydrochloric acid (HCl)) may be used to at least substantially remove catalyst material from the interstitial spaces between the inter-bonded superabrasive grains in the volume of superabrasive material. It is also known to use boiling hydrochloric acid (HCl) and boiling hydrofluoric acid (HF) as leaching agents. One particularly suitable leaching agent is hydrochloric acid (HCl) at a temperature of 110° C. or more, which may be provided in contact with the volume of superabrasive material for a period of about 2 hours to about 60 hours, depending upon the size of the volume of superabrasive material. After leaching the volume of superabrasive material, the interstitial spaces between the inter-bonded superabrasive grains within the volume of superabrasive material may be at least substantially free of catalyst material used to catalyze formation of inter-granular bonds between the superabrasive grains. In some embodiments, leaching may be selectively applied to specific regions of the diamond table, and not to other regions. For example, in some embodiments, a mask may be applied to a region of one or more exterior surfaces of the volume of superabrasive material, and only the unmasked regions may be leached. For example, the leached regions may comprise selected regions of the volume of superabrasive material proximate the front cutting face of the volume of superabrasive material, and/or selected regions of the volume of superabrasive material proximate the lateral side surfaces of the volume of superabrasive material.

The surfaces of the volume within the recesses in the volume of superabrasive material may be leached or not leached. For example, In some embodiments, regions of the volume of superabrasive material exposed at the cutting face and/or the lateral side surface of the volume of superabrasive material may be leached, but the recesses extending into the cutting face and/or the lateral side surface of the volume of superabrasive material may be masked from the leaching agent so as to prevent regions of the volume of superabrasive material exposed within the recesses from being exposed to the leaching agent. For example, a polymeric resin resistant to the leaching agent may be provided within the recesses prior to subjecting the volume of superabrasive material to the leaching process. After the leaching process, the polymeric resin may be removed from within the recesses in the volume of superabrasive material using, for example, a sand or bead blasting process, a grinding process, a chemical etching process, etc.

Additionally, one or more of the outer, exposed surfaces of the volume of superabrasive material of any of the cutting elements described hereinabove in relation to FIGS. 2 through 18 may be physically modified, such as by polishing to a smooth or mirrored finish. For example, an outer surface of the volume of superabrasive material may have a reduced surface roughness, such as described in U.S. Pat. No. 6,145,608, which issued on Nov. 14, 2000 to Lund et al.; U.S. Pat. No. 5,653,300, which issued Aug. 5, 1997 to Lund et al.; and U.S. Pat. No. 5,447,208, which issued Sep. 5, 1995 to Lund et al., the disclosure of each of which is incorporated herein in its entirety by this reference. As a non-limiting example, at least a portion of the front cutting face of the volume of superabrasive material may be polished to a surface roughness of about 0.5 μin. (about 0.0127 μm) RMS or less.

Cutting elements having recesses and/or protrusions in the front cutting face, as described herein, are believed to provide one or more of several different advantages during use of the cutting elements during use in a drilling operation.

For example, as described in the aforementioned U.S. patent application Ser. No. 13/092,396, now U.S. Pat. No. 8,684,112, such recesses and/or protrusions may be used to cause the cutting element to exhibit a selectively varying aggressiveness (e.g., effective rake angle) during drilling as a function of depth-of-cut of the cutting element into the formation. Thus, the aggressiveness of the cutting action may be selectively controlled by selectively controlling the depth-of-cut of the cutting element into the formation, which may be controlled by a drilling operator by controlling the so-called "weight-on-bit" (WOB).

Additionally as described in the aforementioned U.S. Provisional Patent Application Ser. No. 61/535,766, such recesses and/or protrusions may also be used to reduce sticking of formation cuttings to the front cutting face of the cutting element, which may reduce the occurrence of balling and maintain efficient removal of formation cuttings during use in a drilling operation.

Additionally, the presence of such recesses and/or protrusions may allow for the management of (e.g., reduction of) thermal energy within the volume of superabrasive material during drilling, which thermal energy may result in degradation of the superabrasive material. Although the mechanism or mechanisms that result in such a decrease in thermal energy are not fully understood, it is currently believed that the reduction in thermal energy may be at least partially due to increased surface are of the volume of superabrasive material due to the presence of recesses and/or protrusions, and/or due to alteration of the magnitude and/or distribution of compressive and shear forces within the volume of polycrystalline diamond imparted thereon by the formation during cutting of the formation with the cutting element, as well as the magnitude and distributions of residual stresses in the volume of superabrasive material. Such an alteration of the magnitude and/or distribution of the compressive and shear forces/residual stresses within the volume of polycrystalline diamond may result from the alteration of the geometry of the interface between the volume of polycrystalline diamond and the formation when the depth-of-cut of the cutting element results in positioning of the recesses and/or protrusions at the interface between the formation and the front cutting face of the volume of superabrasive material.

Embodiments of cutting elements of the present disclosure may be used to attain one or more of the advantages described above.

Additional non-limiting examples of embodiments of the present disclosure are set forth below.

Embodiment 1: A shaped cutting element for an earth-boring tool, comprising: a substrate; a volume of superabrasive material disposed on the substrate, the volume of superabrasive material having a non-planar front cutting face and a lateral side surface; and at least one of a recess extending into the volume of superabrasive material from the front cutting face and a protrusion extending outward from the front cutting face of the volume of superabrasive material.

Embodiment 2: The shaped cutting element of Embodiment 1, wherein the non-planar front cutting face has a dome shape.

Embodiment 3: The shaped cutting element of Embodiment 1 or Embodiment 2, wherein the non-planar front cutting face has a pointed configuration including a generally conical lateral side surface and a domed end.

Embodiment 4: The shaped cutting element of Embodiment 3, wherein the at least one of a recess extending into the volume of superabrasive material from the front cutting face and a protrusion extending outward from the front cutting face of the volume of superabrasive material comprises at least one recess extending into the generally conical lateral side surface.

Embodiment 5: The shaped cutting element of Embodiment 4, wherein the at least one recess extending into the generally conical lateral side surface has an annular configuration extending at least substantially entirely around a central axis of the shaped cutting element.

Embodiment 6: A cutting element for an earth-boring tool, comprising: a substrate; a volume of superabrasive material disposed on the substrate, the volume of superabrasive material having a front cutting face and a lateral side surface; and at least one of a recess extending into the volume of superabrasive material from the front cutting face and a protrusion extending outward from the front cutting face of the volume of superabrasive material, the at least one of a recess and a protrusion including at least one linear segment extending linearly across the front cutting face in a direction oriented at least substantially transverse to a central axis of the cutting element.

Embodiment 7: The cutting element of Embodiment 6, wherein the at least one of a recess extending into the volume of superabrasive material from the front cutting face and a protrusion extending outward from the front cutting face of the volume of superabrasive material comprises at least one recess extending into the volume of superabrasive material from the front cutting face.

Embodiment 8: The cutting element of Embodiment 7, wherein the at least one recess has a chevron shape.

Embodiment 9: The cutting element of Embodiment 7 or Embodiment 8, wherein the at least one recess comprises two recesses extending at least substantially parallel to one another across the front cutting face.

Embodiment 10: The cutting element of any one of Embodiments 7 through 9, wherein the at least one recess comprises a plurality of recesses dispersed at least substantially entirely across the front cutting face of the cutting element.

Embodiment 11: The cutting element of Embodiments 6 through 9, wherein the substrate has at least one lateral side surface having a non-circular shape in a plane transverse to a central axis of the cutting element.

Embodiment 12: The cutting element of Embodiment 11, wherein the at least one lateral side surface has an oval shape or a triangular shape.

Embodiment 13: A cutting element for an earth-boring tool, comprising: a substrate; a volume of superabrasive material disposed on the substrate, the volume of superabrasive material having a front cutting face and a lateral side surface; and at least one of a plurality of discrete, laterally isolated recesses extending into the volume of superabrasive material from the front cutting face and a plurality of discrete, laterally isolated protrusions extending outward from the front cutting face of the volume of superabrasive material.

Embodiment 14: The cutting element of Embodiment 13, wherein the at least one of a plurality of discrete, laterally isolated recesses and a plurality of discrete, laterally isolated protrusions are dispersed at least substantially entirely across the front cutting face of the cutting element.

Embodiment 15: The cutting element of Embodiment 13 or Embodiment 14, wherein the at least one of a plurality of discrete, laterally isolated recesses and a plurality of discrete, laterally isolated protrusions are disposed in an ordered array over the front cutting face of the cutting element.

Embodiment 16: The cutting element of any one of Embodiments 13 through 15, wherein the at least one of a plurality of discrete, laterally isolated recesses and a plurality of discrete, laterally isolated protrusions comprises a plurality of protrusions extending outward from the front cutting face, each protrusion of the plurality of discrete, laterally isolated protrusions having a shape of a portion of a sphere.

Embodiment 17: A cutting element for an earth-boring tool, comprising: a substrate; a volume of superabrasive material disposed on the substrate, the volume of superabrasive material having a front cutting face and a lateral side surface; and at least one of elongated recess extending into the front cutting face and extending along a helical path from a location proximate a central axis of the cutting element to a lateral, peripheral edge of the cutting element, and an elongated protrusion extending outward from the front cutting face and extending along a helical path from a location proximate a central axis of the cutting element to a lateral, peripheral edge of the cutting element.

Embodiment 18: The cutting element of Embodiment 17, wherein the at least one of an elongated recess and an elongated protrusion comprises an elongated protrusion.

Embodiment 19: The cutting element of Embodiment 18, wherein the elongated protrusion has a curved outer surface.

Embodiment 20: The cutting element of Embodiment 19, wherein the elongated protrusion has a width increasing along the elongated protrusion in the direction extending along the elongated protrusion from the location proximate the central axis of the cutting element to the lateral, peripheral edge of the cutting element.

Embodiment 21: A cutting element for an earth-boring tool, comprising: a substrate; a volume of superabrasive material disposed on the substrate, the volume of superabrasive material having a front cutting face and a lateral side surface; and at least one of a recess extending into the volume of superabrasive material from the front cutting face and a protrusion extending outward from the front cutting face of the volume of superabrasive material; and a recess extending into the volume of superabrasive material from the lateral side surface of the volume of superabrasive material.

Embodiment 22: The cutting element of Embodiment 21, wherein the recess extending into the volume of superabrasive material from the lateral side surface of the volume of superabrasive material extends circumferentially around an entire lateral periphery of the volume of superabrasive material.

Embodiment 23: An earth-boring tool, comprising: a tool body; and at least one cutting element as recited in any one of Embodiments 1 through 22 bonded to the tool body.

Embodiment 24: The earth-boring tool of Embodiment 23, wherein the earth-boring tool comprises a fixed-cutter rotary drill bit.

Embodiment 25: A method of forming a shaped cutting element for an earth-boring tool, comprising: disposing a volume of superabrasive material on a substrate; forming a non-planar front cutting face and a lateral side surface on the volume of superabrasive material; and forming at least one of a recess extending into the volume of superabrasive material from the front cutting face and a protrusion extending outward from the front cutting face of the volume of superabrasive material.

Embodiment 26: The method of Embodiment 25, wherein forming the non-planar front cutting face comprises forming the non-planar front cutting face to have a dome shape.

Embodiment 27: The method of Embodiment 25 or Embodiment 26, wherein forming the non-planar front cutting face comprises forming the non-planar front cutting face to have a pointed configuration including a generally conical lateral side surface and a domed end.

Embodiment 28: The method of Embodiments 25 through 27, wherein forming the at least one of a recess extending into the volume of superabrasive material from the front cutting face and a protrusion extending outward from the front cutting face of the volume of superabrasive material comprises forming at least one recess extending into the generally conical lateral side surface.

Embodiment 29: The method of Embodiment 28, wherein forming the at least one recess extending into the generally conical lateral side surface comprises forming the at least one recess to have an annular configuration extending at least substantially entirely around a central axis of the shaped cutting element.

Embodiment 30: A method of forming a cutting element for an earth-boring tool, comprising: disposing a volume of superabrasive material disposed on a substrate; forming the volume of superabrasive material to have a front cutting face and a lateral side surface; and forming at least one of a recess extending into the volume of superabrasive material from the front cutting face and a protrusion extending outward from the front cutting face of the volume of superabrasive material, and forming the at least one of a recess and a protrusion to include at least one linear segment extending linearly across the front cutting face in a direction oriented at least substantially transverse to a central axis of the cutting element.

Embodiment 31: The method of Embodiment 30, wherein forming the at least one of a recess extending into the volume of superabrasive material from the front cutting face and a protrusion extending outward from the front cutting face of the volume of superabrasive material comprises forming at least one recess extending into the volume of superabrasive material from the front cutting face.

Embodiment 32: The method of Embodiment 31, wherein forming the at least one recess comprises forming the at least one recess to have a chevron shape.

Embodiment 33: The method of Embodiment 31 or Embodiment 32, wherein forming the at least one recess comprises forming two recesses extending at least substantially parallel to one another across the front cutting face.

Embodiment 34: The method of Embodiment 33, wherein forming the at least one recess comprises forming a plurality of recesses dispersed at least substantially entirely across the front cutting face of the cutting element.

Embodiment 35: The method of any one of Embodiments 30 through Embodiment 34, further comprising forming the substrate to have at least one lateral side surface having a non-circular shape in a plane transverse to a central axis of the cutting element.

Embodiment 36: The method of Embodiment 35, further comprising forming the at least one lateral side surface of the substrate to have an oval shape or a triangular shape.

Embodiment 37: A method of forming a cutting element for an earth-boring tool, comprising: disposing a volume of superabrasive material on a substrate; forming the volume of superabrasive material to have a front cutting face and a lateral side surface; and forming at least one of a plurality of discrete, laterally isolated recesses extending into the volume of superabrasive material from the front cutting face and a plurality of discrete, laterally isolated protrusions extending outward from the front cutting face of the volume of superabrasive material.

Embodiment 38: The method of Embodiment 37, wherein forming the at least one of a plurality of discrete, laterally isolated recesses and a plurality of discrete, laterally isolated protrusions comprises forming the at least one of a plurality of discrete, laterally isolated recesses and a plurality of discrete, laterally isolated protrusions to be dispersed at least substantially entirely across the front cutting face of the cutting element.

Embodiment 39: The method of Embodiment 37 or Embodiment 38, wherein forming the at least one of a plurality of discrete, laterally isolated recesses and a plurality of discrete, laterally isolated protrusions comprises disposing the at least one of a plurality of discrete, laterally isolated recesses and a plurality of discrete, laterally isolated protrusions in an ordered array over the front cutting face of the cutting element.

Embodiment 40: The method of any one of Embodiments 37 through 39, wherein forming the at least one of a plurality of discrete, laterally isolated recesses and a plurality of discrete, laterally isolated protrusions comprises forming a plurality of protrusions extending outward from the front cutting face, each protrusion of the plurality of discrete, laterally isolated protrusions having a shape of a portion of a sphere.

Embodiment 41: A method of forming a cutting element for an earth-boring tool, comprising: disposing a volume of superabrasive material on a substrate; forming the volume of superabrasive material to have a front cutting face and a lateral side surface; and forming at least one of an elongated recess extending into the front cutting face and extending along a helical path from a location proximate a central axis of the cutting element to a lateral, peripheral edge of the cutting element, and an elongated protrusion extending outward from the front cutting face and extending along a helical path from a location proximate a central axis of the cutting element to a lateral, peripheral edge of the cutting element.

Embodiment 42: The method of Embodiment 41, wherein forming the at least one of an elongated recess and an elongated protrusion comprises forming an elongated protrusion.

Embodiment 43: The method of Embodiment 42, wherein forming the elongated protrusion comprises forming the elongated protrusion to have a curved outer surface.

Embodiment 44: The method of Embodiment 42 or Embodiment 43, further comprising forming the elongated protrusion to have a width increasing along the elongated protrusion in the direction extending along the elongated protrusion from the location proximate the central axis of the cutting element to the lateral, peripheral edge of the cutting element.

Embodiment 45: A method of forming a cutting element for an earth-boring tool, comprising: disposing a volume of superabrasive material on a substrate; forming the volume of superabrasive material to have a front cutting face and a lateral side surface; forming at least one of a recess extending into the volume of superabrasive material from the front cutting face and a protrusion extending outward from the front cutting face of the volume of superabrasive material; and forming a recess extending into the volume of superabrasive material from the lateral side surface of the volume of superabrasive material.

Embodiment 46: The method of Embodiment 45, further comprising forming the recess extending into the volume of superabrasive material from the lateral side surface of the volume of superabrasive material to extend circumferentially around an entire lateral periphery of the volume of superabrasive material.

Embodiment 47: A method of forming an earth-boring tool, comprising: forming at least one cutting element as recited in any one of Embodiments 25 through 46; and attaching the at least one cutting element to a body of an earth-boring tool.

Embodiment 48: The method of Embodiment 47, further comprising selecting the body of the earth-boring tool to comprise a body of a fixed-cutter rotary drill bit.

Although the foregoing description contains many specifics, these are not to be construed as limiting the scope of the present disclosure, but merely as providing certain example embodiments. Similarly, other embodiments of the disclosure may be devised which are within the scope of the present invention. For example, features described herein with reference to one embodiment may also be combined with features of other embodiments described herein. The scope of the invention is, therefore, indicated and limited only by the appended claims, rather than by the foregoing description. All additions, deletions, and modifications to the invention, as disclosed herein, which fall within the meaning and scope of the claims, are encompassed by the present invention.

What is claimed is:

1. A cutting element for an earth-boring tool, comprising:
   a substrate having a lateral side surface;
   a volume of superabrasive material disposed on the substrate, the volume of superabrasive material having a front cutting face and a lateral side surface coextensive and continuous with the lateral side surface of the substrate;
   at least one of a recess extending into the volume of superabrasive material from the front cutting face and a protrusion extending outward from the front cutting face of the volume of superabrasive material; and
   a recess extending only into the lateral side surface of the volume of superabrasive material, longitudinally spaced from an interface between the volume of superabrasive material and the substrate by a portion of the lateral side surface of the volume of superabrasive material parallel to the lateral side surface of the substrate.

2. The cutting element of claim 1, wherein the recess extending only into the lateral side surface of the volume of superabrasive material extends circumferentially around an entire lateral periphery of the volume of superabrasive material.

3. The cutting element of claim 1, wherein the recess extending only into the lateral side surface of the volume of superabrasive material has an arcuate shape when viewed in a cross-sectional plane extending along a longitudinal axis of the cutting element.

4. The cutting element of claim 1, wherein the recess extending only into the lateral side surface of the volume of superabrasive material has one or more linear profile segments when viewed in a cross-sectional plane extending along a longitudinal axis of the cutting element.

5. The cutting element of claim 1, wherein the front cutting face of the volume of superabrasive material is substantially planar.

6. The cutting element of claim 1, wherein the at least one of a recess extending into the volume of superabrasive material from the front cutting face and a protrusion extending outward from the front cutting face of the volume of superabrasive material comprises a recess extending into the volume of superabrasive material from the front cutting face, the recess having an annular configuration.

7. The cutting element of claim 5, wherein the at least one of a recess extending into the volume of superabrasive material from the front cutting face and a protrusion extending outward from the front cutting face of the volume of superabrasive material comprises a substantially planar surface recessed into the front cutting face of the volume of superabrasive material.

8. The cutting element of claim 1, wherein:
the at least one of a recess extending into the volume of superabrasive material from the front cutting face and a protrusion extending outward from the front cutting face of the volume of superabrasive material comprises a recess extending into the volume of superabrasive material from the front cutting face; and
the volume of superabrasive material comprises a lip extending radially from the recess extending into the lateral side surface of the volume of superabrasive material, the lip extending longitudinally from the recess extending into the volume of superabrasive material from the front cutting face.

9. The cutting element of claim 8, wherein the lip is configured to concentrate shear stresses in a region of subterranean earth formation material adjacent the lip during use of the cutting element in an earth-boring operation.

10. The cutting element of claim 1, wherein the front cutting face comprises a dome shape.

11. The cutting element of claim 1, further comprising a chamfered peripheral edge around the front cutting face of the volume of superabrasive material.

12. The cutting element of claim 11, wherein the front cutting face is non-planar, and further comprising an annular recess therein having an arcuate, concave profile when viewed in a cross-sectional plane extending along a longitudinal axis of the cutting element.

13. The cutting element of claim 12, wherein a portion of the front cutting face located radially between the chamfered peripheral edge and the recess has a rounded, convex profile in a cross-sectional plane extending along the longitudinal axis of the cutting element.

14. The cutting element of claim 12, wherein the front cutting face between the chamfered peripheral edge and a radially inner extent of the recess comprises a nonlinear profile including two opposing arcs when viewed in a cross-section plane extending along the longitudinal axis of the cutting element.

* * * * *